United States Patent
Masui et al.

(10) Patent No.: US 7,867,647 B2
(45) Date of Patent: Jan. 11, 2011

(54) HYDROGEN GENERATION DEVICE AND FUEL CELL SYSTEM INCLUDING SAME

(75) Inventors: Takatoshi Masui, Mishima (JP); Hiroyuki Mitsui, Nagoya (JP); Hiroshi Aoki, Nagoya (JP); Takashi Shimazu, Nagoya (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 500 days.

(21) Appl. No.: 11/885,636

(22) PCT Filed: Apr. 4, 2006

(86) PCT No.: PCT/IB2006/000776

§ 371 (c)(1),
(2), (4) Date: Sep. 5, 2007

(87) PCT Pub. No.: WO2006/106403

PCT Pub. Date: Oct. 12, 2006

(65) Prior Publication Data

US 2008/0160367 A1    Jul. 3, 2008

(30) Foreign Application Priority Data

Apr. 5, 2005 (JP) .............................. 2005-108937

(51) Int. Cl.
*H01M 10/50* (2006.01)
*H01M 8/00* (2006.01)
*F01N 3/20* (2006.01)
*C01B 3/02* (2006.01)

(52) U.S. Cl. ...................... 429/120; 429/400; 422/105; 423/648.1

(58) Field of Classification Search ...................... None
See application file for complete search history.

(56) References Cited

U.S. PATENT DOCUMENTS 3,962,411 A    6/1976   Setzer et al.

(Continued)

FOREIGN PATENT DOCUMENTS

EP    1 394 884 A2    3/2004

(Continued)

OTHER PUBLICATIONS

Berlowitz, P.J., et al. "A Breakthrough Technology for Hydrogen Production," 2004 Fuel Cell Seminar Abstracts, San Antonio, Texas, Nov. 1-5, 2004.

(Continued)

*Primary Examiner*—Emily M Le
*Assistant Examiner*—Sarah Van Oudenaren
(74) *Attorney, Agent, or Firm*—Oliff & Berridge, PLC

(57) ABSTRACT

In a hydrogen generation device according to the invention, PSR reformers have a heat capacity smaller than that of the other PSR reformers. Therefore, the temperature of the catalyst reaches to a reforming-start temperature more quickly in the PSR reformers than in the other PSR reformers. When the hydrogen generation device is started and the reforming reaction is carried out, the mixture of gasoline vapor and water vapor is selectively and preferentially supplied to the PSR reformers so that the reforming reaction is carried out in the PSR reformers.

12 Claims, 10 Drawing Sheets

U.S. PATENT DOCUMENTS

| | | |
|---|---|---|
| 4,240,805 A | 12/1980 | Sederquist |
| 2003/0134166 A1 | 7/2003 | Skala et al. |
| 2003/0235529 A1 | 12/2003 | Hershkowitz et al. |
| 2004/0170558 A1 | 9/2004 | Hershkowitz |
| 2004/0170559 A1 | 9/2004 | Hershkowitz et al. |
| 2004/0175326 A1 | 9/2004 | Hershkowitz et al. |
| 2004/0241505 A1 | 12/2004 | Hershkowitz et al. |

FOREIGN PATENT DOCUMENTS

| | | |
|---|---|---|
| JP | A-59-16537 | 1/1984 |
| JP | A-2002-237321 | 8/1990 |
| JP | A-02-0234361 | 9/1990 |
| JP | A-03-182591 | 8/1991 |
| JP | A 2002-211906 | 7/2002 |
| JP | A-2003-104706 | 4/2003 |
| JP | A-2003-335503 | 11/2003 |
| JP | A 2004-785407 | 3/2004 |
| JP | A-2004-146337 | 5/2004 |
| JP | A 2004-146337 | 5/2004 |

OTHER PUBLICATIONS

Office Action issued in Japanese Patent Application No. 2005-108937 on Apr. 27, 2010 and partial translation.

FIG. 8
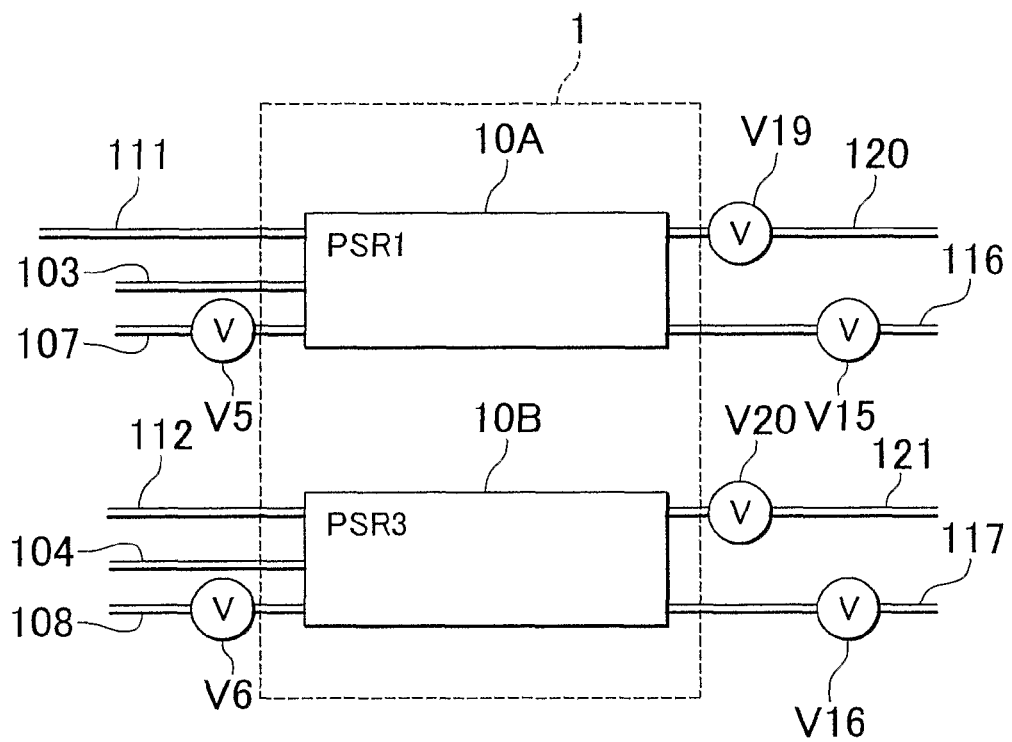
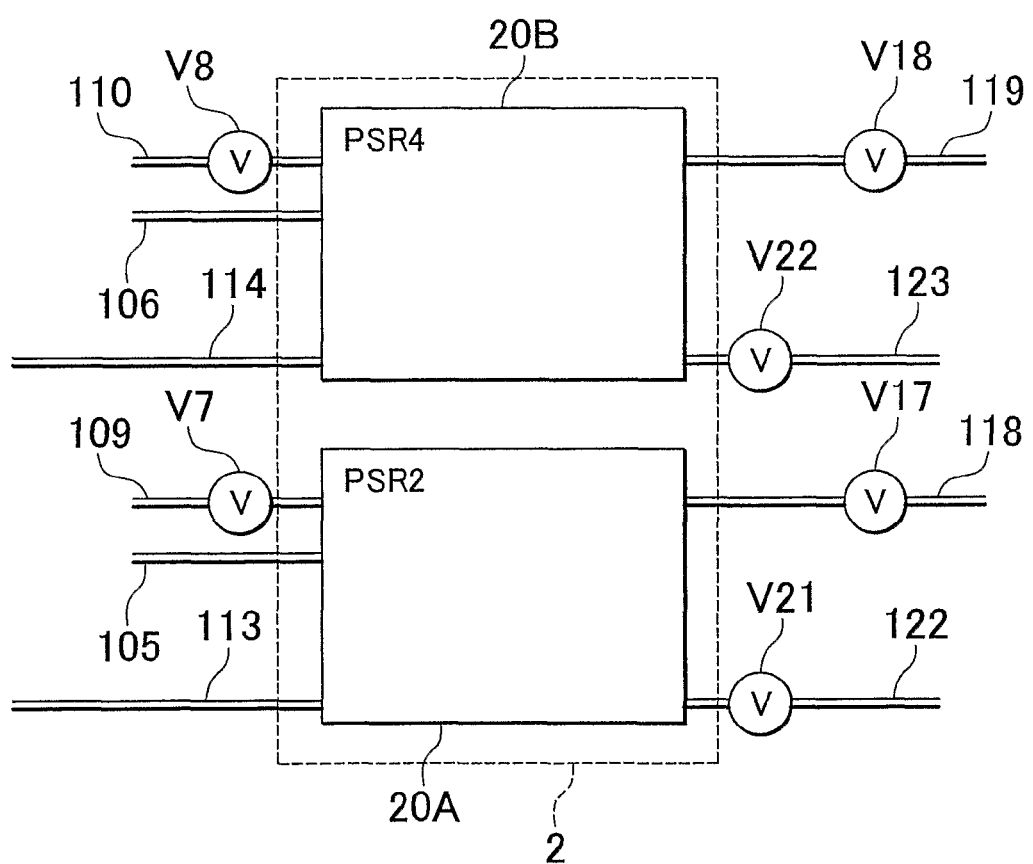

HYDROGEN GENERATION DEVICE AND FUEL CELL SYSTEM INCLUDING SAME

BACKGROUND OF THE INVENTION

1. Field of the Invention

The invention relates to a hydrogen generation device that alternately generates hydrogen through a reforming reaction using a catalyst, and recovers the catalyst via a recovery reaction. The recovery reaction recovers the catalyst by heating the catalyst for the next reforming reaction. The invention also relates to a fuel cell system that includes the hydrogen generation device.

2. Description of the Related Art

In electric vehicles, a fuel cell is provided as a power source. Hydrogen used to generate electric power in the fuel cell, or reactant used to generate hydrogen is provided.

In the case where hydrogen itself is provided, it may be stored in the following ways: (i) the hydrogen gas is compressed, and stored in a high-pressure container, (ii) the hydrogen gas is liquefied and stored in a tank, or (iii) the hydrogen is provided using hydrogen storage alloy or hydrogen adsorbent. When hydrogen gas is stored in a high-pressure container as described in (i), only a small amount of hydrogen can be stored in the high-pressure container because of the thick walls and small internal volume of the container. When liquefied hydrogen is stored as described in (ii), a portion of the liquefied hydrogen is lost due to vaporization, and a great amount of energy is expended in liquefying hydrogen. When hydrogen is provided using the hydrogen storage alloy or the hydrogen adsorbent as described in (iii), the density of stored hydrogen is generally lower than that needed to power an electric vehicle. Further, controlling storage, adsorption, and the like of hydrogen is difficult. In the case where the reactant is provided, hydrogen gas may be generated through a steam-reforming reaction using the reactant. However, because the reforming reaction is an endothermic reaction, a heat source needs to be provided. Providing an electric heater or the like as the heat source in the system decreases the energy efficiency of the entire system. In addition, the system must also be able to extract the amount of hydrogen needed to power the vehicle under the various environmental conditions in which the vehicle operates.

Currently, a method for supplying hydrogen has not been technically established. However, because it is predicted that hydrogen will be used in the increasing number of devices, the method of supplying hydrogen needs to be established.

As a technology related to the above, US Patent Application Publication No. 2003-0235529 describes a reforming device that generates hydrogen by alternately carrying out a steam-reforming reaction and a recovery reaction. The steam-reforming reaction is an endothermic reaction, and is carried out using reactant on a catalyst under specified conditions. The recovery reaction is used to raise the temperature of the catalyst, which has decreased as a result of the steam-reforming reaction.

In the reforming device for generating hydrogen, a pair of catalysts is used. When the reforming reaction is carried out on one of the catalysts, the recovery reaction is carried out on the other catalyst. The reforming reaction and the recovery reaction are carried out alternately on each catalyst. This helps to maintain a consistent level of performance of the reforming reaction. The reforming device is particularly suitable for reforming liquid fuel or the like from which the sulfur components have not been completely removed.

For example, US Patent Application Publication No. 2004-0170558, No. 2004-0170559, and No. 2004-0175326 also describe technologies related to the above. Also, Japanese Patent Application Publication No. 2004-146337 describes a fuel cell that includes a hydrogen-permeable material, and generates electric power in a high temperature range.

Because the reforming reaction is most efficient at high temperatures, the temperatures of the two or more catalysts need to be increased. Therefore, when the catalysts are cold, for example, when the reforming device is started, all the catalysts need to be heated. As a result, much time is required to bring the temperatures of all the catalysts to the appropriate temperature for generating the amount of hydrogen that is needed. That is, the reforming device cannot be activated in a short time. When the amount of hydrogen needed sharply increases due to a sharp increase in the demand for electric power, for example, when the load on the HMFC 30 increases while the fuel cell is generating electric power, the reforming device cannot generate the additional hydrogen required immediately.

Particularly in the case where a fuel cell system that includes the fuel cell is provided in a vehicle, for example, a large-sized electric power storage device needs to be provided to supply electric power before the fuel cell starts to generate electric power. The power storage device is needed because the amount of hydrogen gas that is generated by the reforming device and supplied to the fuel cell is initially insufficient to generate the electric power required. However, the additional components not only increase the weight of the fuel cell system, but the cost of the system as well. Also, it is difficult to supply electric power stably using the large-sized electric power storage device. Further, the large-sized electric power storage device occupies a large space in the vehicle.

SUMMARY OF THE INVENTION

In view of the above, the invention provides a hydrogen generation device where a reforming reaction for generating hydrogen can be quickly started, and the required amount of hydrogen can be quickly and efficiently generated by the reforming reaction, for example, in the case where the hydrogen generation device is started when the temperature of a catalyst is lower than the temperature at which the reforming reaction can be carried out. The invention also provides a fuel cell system where a reforming reaction can be quickly started, and the required amount of electric power can be stably generated, for example, in the case where the fuel cell system is started when the temperature of a catalyst is lower than the temperature at which the reforming reaction can be carried out.

A steam-reforming reaction to generate hydrogen and a recovery reaction may be carried out alternately. The steam-reforming reaction is an endothermic reaction. The recovery reaction is an exothermic reaction. Thus, the recovery reaction raises the temperature of the catalyst, while the steam-reforming reaction lowers the temperature of the catalyst. Thus, by carrying out the recovery reaction alternately with the reforming reaction, it is possible to maintain the efficiency of the catalyst in generating hydrogen. In this case, the speed at which hydrogen is generated by the reforming reaction, that is, the speed at which the catalyst is brought to the reaction temperature needs to be increased before ordinary operation of a hydrogen generation device starts, for example, when the hydrogen generation device is started. The speed at which hydrogen is generated (heating speed of the catalyst) can be effectively improved by providing a plurality of reformers that have different heat efficiencies, for example, different heat capacities. In each of the reformers, the reforming reaction and the recovery reaction are carried out alternately. In view of this, the invention is made. The exothermic reaction according to the invention includes a combustion reaction.

A first aspect of the invention relates to a hydrogen generation device that includes a plurality of reformers; switching means; and switching control means. Each of the plurality of reformers includes a catalyst. In each of the plurality of reformers, a reforming reaction is carried out using reactant on the catalyst, and an exothermic reaction is carried out using exothermic material to heat the catalyst. The switching means switches among supply passages through which the reactant is supplied to the plurality of reformers, and switches among supply passages through which the exothermic material is supplied to the plurality of reformers. When the reforming reaction is started, the switching control means controls the switching means so that at least one reformer in which the temperature of the catalyst reaches a reforming-start temperature is selected among the plurality of reformers, and the reactant is supplied to the at least one selected reformer. The reforming-start temperature is the temperature at which the reforming reaction can be carried out. For example, at least one reformer in which the temperature of the catalyst reaches the reforming-start temperature in the shortest time may be selected first, and at least one reformer in which the temperature of the catalyst reaches the second-shortest time may be selected next.

In the hydrogen generation device according to the invention, at least two reformers (hereinafter, will be sometimes referred to as "pressure swing reforming (PSR) reformers") are provided. In each of the reformers, the steam-reforming reaction for generating hydrogen and a recovery reaction can be carried out alternately. The steam-reforming reaction is carried out using stored heat. The recovery reaction restores the amount of stored heat that has decreased due to the steam-reforming reaction. The steam-reforming reaction for generating hydrogen is carried out in at least one reformer, and the recovery reaction is carried out in the other at least one reformer (hereinafter, the hydrogen generation device will be sometimes referred to as "PSR device").

The invention may employ, for example, the steam-reforming reaction as the endothermic reaction, and a partial oxidation reaction as the exothermic reaction as described below. In the reforming reaction according to the invention, the steam-reforming reaction represented by an equation (1) described below is mainly carried out.

$$CnH_{2n+2} + nH_2O \rightarrow (2n+1)H_2 + nCO \quad (1)$$

$$CnH_{2n+2} + (n/2)O_2 \rightarrow (n+1)H_2 + nCO \quad (2)$$

$$CO + H_2O \Leftrightarrow CO_2 + H_2 \quad (3)$$

$$CO + 3H_2 \Leftrightarrow CH_4 + H_2O \quad (4)$$

For example, in the case where two reformers are provided, the steam-reforming reaction that is the endothermic reaction is carried out using stored heat in one of the reformers, and the recovery reaction that is the exothermic reaction is carried out in the other reformer. The switching means switches among the passages through which the reactant is supplied to the two reformers, and switches among the passages through which the exothermic material is supplied to the two reformers. As the amount of stored heat in one reformer decreases due to the steam-reforming reaction, the switching means switches among the supply passages so that the reaction in the reformer is switched to the recovery reaction. Concomitantly, the recovery reaction in the other reformer is switched to the reforming reaction to generate hydrogen using the heat generated by the recovery reaction. Accordingly, a heater or the like does not need to be provided, and hydrogen can be continuously generated while using heat energy efficiently.

In the first aspect, the reactant is preferentially supplied to at least one reformer in which the temperature (particularly the temperature of the catalyst) has reached the reforming-start temperature, among the plurality of reformers. Then, the reforming reaction is preferentially carried out in the at least one reformer in which the temperature of the catalyst has reached the reforming-start temperature. As a result, the reforming reaction can be started quickly, for example, in the case where the hydrogen generation device is started when the temperatures of the catalysts are lower than the reforming-start temperature. Thus, the time required to start the reforming reaction can be effectively reduced. This improves startability of the hydrogen generation device.

Also, because the reactant is supplied to the at least one reformer in which the temperature of the catalyst reaches the reforming-start temperature more quickly than in the rest of the reformers, the hydrogen generation device can generate the required amount of hydrogen quickly, during a transition time, for example, when the load on the fuel cell increases during generation of electric power and the amount of hydrogen required in the fuel cell sharply increases.

In the first aspect, the hydrogen generation device may further include temperature detection means for detecting the temperature of the catalyst in each reformer; and determination means for determining whether the temperature of the catalyst has reached the reforming-start temperature. If the determination means determines that the temperature of the catalyst has reached the reforming-start temperature in at least one reformer, the switching control means may control the switching means to select the at least one selected reformer. That is, the switching control means controls the switching means to switch among the supply passages, whereby the reactant is supplied to the at least one selected reformer.

In some configurations, or in some operating states, the reformer(s) where the temperature of the catalyst reaches the reforming-start temperature more quickly than in the rest of the reformers cannot be determined. This may occur, for example, in the case where the heat capacities of the PSR reformers are not known, or there is no great difference in the heat capacity between the plurality of PSR reformers, or the hydrogen generation device is restarted when the temperatures of the catalysts have not greatly decreased yet. However, according to the aforementioned aspect, the reformer(s) where the temperature of the catalyst reaches the reforming-start temperature more quickly than in the rest of the reformers can be selected based on the actual amounts of heat stored in the reformers, more specifically, the detected temperatures of the catalysts. Therefore, the reforming reaction can be carried out based on the temperatures of the catalysts in the reformers. As a result, the reforming reaction can be started quickly after the hydrogen generation device is started. That is, the time required to start the reforming reaction for generating hydrogen is significantly reduced. This greatly improves startability of the hydrogen generation device.

In the hydrogen generation device according to the first aspect, the plurality of reformers may include a reformer that has a first heat capacity, and a reformer that has a second heat capacity that is greater than the first heat capacity. The switching control means may control the switching means so that the reactant is preferentially supplied to the reformer that has the first heat capacity. The reformer that has the first heat capacity may be paired with the reformer that has the second heat capacity. At least one pair of the reformer that has the first heat capacity and the reformer that has the second heat capacity may be made.

In the aforementioned aspect, the reforming reaction is carried out in one of the paired reformers, and the recovery reaction is carried out in the other of the paired reformers. The temperature of the catalyst in the reformer with the smaller heat capacity reaches the reforming-start temperature more quickly than the temperature of the catalyst in the reformer with the greater capacity. The reforming reaction is preferentially carried out in the reformer in which the temperature of the catalyst reaches the reforming-start temperature more quickly. As a result, the reforming reaction can be started quickly, for example, in the case where the hydrogen generation device is started when the temperatures of the catalysts are lower than the reforming-start temperature. That is, the time required to start the reforming reaction for generating hydrogen can be effectively reduced. This effectively improves startability of the hydrogen generation device.

During a transition time, for example, when the demand for hydrogen sharply increases, the reforming reaction is preferentially carried out in the reformer that has the smaller heat capacity. As a result, the hydrogen generation device can generate the required amount of hydrogen efficiently.

In the hydrogen generation device according to the first aspect, the plurality of reformers may include a first pair structure and a second pair structure. The first pair structure includes at least one pair of reformers that have a heat capacity smaller than or equal to a predetermined heat capacity, and the second pair structure includes at least one pair of reformers that have a heat capacity greater than the predetermined heat capacity. The switching control means may control the switching means to select the first pair structure and supply the reactant to at least one of the reformers in the first pair structure. As described above, in each of the first pair structure and the second pair structure, when the reforming reaction is carried out in one of the paired reformers, the recovery reaction is carried out in the other of the paired reformers.

In the aforementioned aspect, the temperature of the catalyst reaches the reforming-start temperature more quickly in the first pair structure than in the second pair structure. The reforming reaction is preferentially carried out in at least one of the reformers in the first pair structure. As a result, the reforming reaction can be started quickly, for example, in the case where the hydrogen generation device is started when the temperatures of the catalysts are lower than the reforming-start temperature. That is, the time required to start the reforming reaction can be effectively reduced. This improves startability of the hydrogen generation device effectively. Also, because the reforming reaction is carried out in at least one of the reformers in the first pair structure, the hydrogen generation device can quickly generate the additional amount of hydrogen required, for example, during the transition time (e.g., when the load on the fuel cell sharply increases).

In the hydrogen generation device according to the first aspect, the switching means switches among the supply passages through which the reactant is supplied, and switches among the supply passages through which the exothermic material is supplied. In addition, the switching means may switch among supply passages through which oxygen-containing gas is supplied. The switching control means may control the switching means so that the reactant and the oxygen-containing gas are supplied to the plurality of reformers before at least one reformer to which the reactant should be supplied is selected, that is, before the temperature (particularly the temperature of the catalyst) reaches the reforming-start temperature in at least one reformer.

In the aforementioned aspect, when the temperatures of the reformers (particularly, the temperatures of the catalysts) are lower than the reforming-start temperature, particularly when the hydrogen generation device is started, the reactant and the oxygen-containing gas are supplied to the reformers, whereby the exothermic reaction is carried out to bring the temperatures of the catalysts to the reforming-start temperature.

In the hydrogen generation device according to the first aspect, the switching control means may operate when the hydrogen generation device is started.

A second aspect of the invention relates to a fuel cell system. The fuel cell includes the hydrogen generation device according to the first aspect of the invention; and a fuel cell that generates electric power using hydrogen-containing gas that is generated by the hydrogen generation device.

As described above, the reactant is preferentially supplied to at least one reformer in which the temperature of the catalyst has reached the reforming-start temperature so that the reforming reaction is carried out in the at least one reformer. Therefore, the reforming reaction can be started quickly and the required amount of hydrogen can be generated efficiently, for example, in the case where the fuel cell system is started when the temperatures of the catalysts are lower than the reforming-start temperature in the hydrogen generation device of the fuel cell system. That is, the time required to start the reforming reaction for generating hydrogen can be greatly reduced, and the ordinary operation for generating electric power can be stably performed.

In the second aspect, the fuel cell may include an electrolyte membrane where an electrolyte layer is provided on at least one surface of a hydrogen-permeable metal layer. In the case where the fuel cell includes the electrolyte membrane where the electrolyte layer is provided on at least one surface of the hydrogen-permeable layer, the operating temperature range of the fuel cell is 300° C. to 600° C. This operating temperature range is substantially the same as a reaction temperature range where the reforming reaction proceeds. Therefore, the temperature of the hydrogen-rich gas that is generated by the hydrogen generation device is in the operating temperature range of the fuel cell. Also, gas discharged from the anode of the fuel cell (hereinafter, referred to as "anode off-gas") and gas discharged from the cathode of the fuel cell (hereinafter, referred to as "cathode off-gas") can be delivered to the PSR reformers without changing the temperatures of the gas, and used in the recovery reaction and the like. Therefore, by employing the fuel cell that includes such an electrolyte membrane, heat can be effectively used in the fuel cell system. In addition, this obviates the need to preheat the hydrogen-rich gas before supplying it to the fuel cell.

In the hydrogen generation device according to the invention, the reforming reaction is carried out using heat stored in the reformer. In the fuel cell system according to the invention, hydrogen that is generated by the steam-reforming reaction is supplied to the fuel cell, and the amount of heat, which is decreased by the steam-reforming reaction for generating hydrogen, is increased through the recover reaction (exothermic reaction). Also, the reforming reaction and the recovery reaction are carried out alternately. As a result, the reforming reaction can be started quickly, the required amount of hydrogen can be generated using the reactant efficiently, and the operation for generating electric power can be stably performed in the case where the fuel cell system is started when the temperatures of the catalysts are lower than the reforming-start temperature.

In the hydrogen generation device according to the aforementioned aspect, the reforming reaction for generating hydrogen can be started quickly, and the required amount of hydrogen can be generated efficiently in the case where the hydrogen generation device is started when the temperatures of the catalysts are lower than the reforming-start temperature. Further, in the fuel cell system according to the aforementioned aspect, the reforming reaction for generating hydrogen can be started quickly, and the required amount of electric power can be stably generated in the case where the fuel cell system is started when the temperatures of the catalysts are lower than the reforming-start temperature.

According to the invention, in a method for controlling a hydrogen generation device, the temperature of a catalyst in each of a plurality of reformers is monitored to determine whether the catalyst has reached the reforming-start temperature at which reforming reaction can be carried out. At least one reformer in which the temperature of the catalyst has reached the reforming-start temperature is selected among the plurality of reformers. Reactant to the at least one selected reformer.

According to the invention, a hydrogen generating device includes a plurality of reformers; a switching portion; and a switching control portion. Each of the plurality of reformers includes a catalyst. In each of the plurality of reformers, a reforming reaction is carried out using reactant on the catalyst, and an exothermic reaction is carried out using exothermic material to heat the catalyst. The switching portion switches among supply passages through which the reactant is supplied to the plurality of reformers, and switches among supply passages through which the exothermic material is supplied to the plurality of reformers. When the reforming reaction is started, the switching control portion controls the switching portion so that at least one reformer in which the temperature of the catalyst has reached a reforming-start temperature is selected among the plurality of reformers, and the reactant is supplied to the at least one selected reformer. The reforming-start temperature is the temperature at which the reforming reaction can be carried out.

BRIEF DESCRIPTION OF THE DRAWINGS

The foregoing and/or further objects, features and advantages of the invention will become more apparent from the following description of example embodiments with reference to the accompanying drawings, in which the same or corresponding portions are denoted by the same reference numerals and wherein:

FIG. 8 illustrates a schematic diagram showing the configuration of a portion of a fuel cell system according to a fourth embodiment of the invention;

DETAILED DESCRIPTION OF THE EXAMPLE EMBODIMENTS

Hereinafter, a fuel cell system according to an embodiment of the invention will be described in detail with reference to the drawings. A hydrogen generation device according to the invention will be also described in the context of the description of the fuel cell system. In the embodiments described below, gas discharged from the anode of the fuel cell (hereinafter, referred to as "anode off-gas") may be used as the exothermic material.

A fuel cell system according to a first embodiment of the invention will be described with reference to FIG. 1 to FIG. 5. The fuel cell system according to the embodiment is provided in an electric vehicle. The fuel cell system includes a hydrogen membrane fuel cell (hereinafter, referred to as "HMFC") and a hydrogen generation device according to the invention. The HMFC includes an electrolyte membrane where proton-conductive ceramic is provided on the surface of a hydrogen-permeable metal membrane. The hydrogen generation device includes reformers that have different heat capacities. When the fuel cell system is started, the temperature of the catalyst is raised to the temperature at which the reforming reaction can be carried out (hereinafter, referred to as "reforming-start temperature"). The reformers that have the smaller heat capacity will reach the reforming-start temperature more quickly than the reformers that have the greater heat capacity. As a result, the reforming reaction is preferentially started in the reformers that have the smaller heat capacity.

The hydrogen generation device according to the embodiment is formed by connecting two reforming devices in parallel. Each reforming device includes two reformers, each with a different predetermined heat capacity. The HMFC generates electric power using the hydrogen generated by the hydrogen generation device.

In the hydrogen generation device according to the embodiment, a mixture of gasoline vapor and water vapor is used as reactant, and anode off-gas discharged from the hydrogen electrode (anode) of the fuel cell is used as the exothermic material that is consumed in the recovery reaction. The anode off-gas may be supplied along with gasoline, hydrogen gas, and the like, if necessary. However, the invention is not limited to the embodiment described below.

Figure 1:
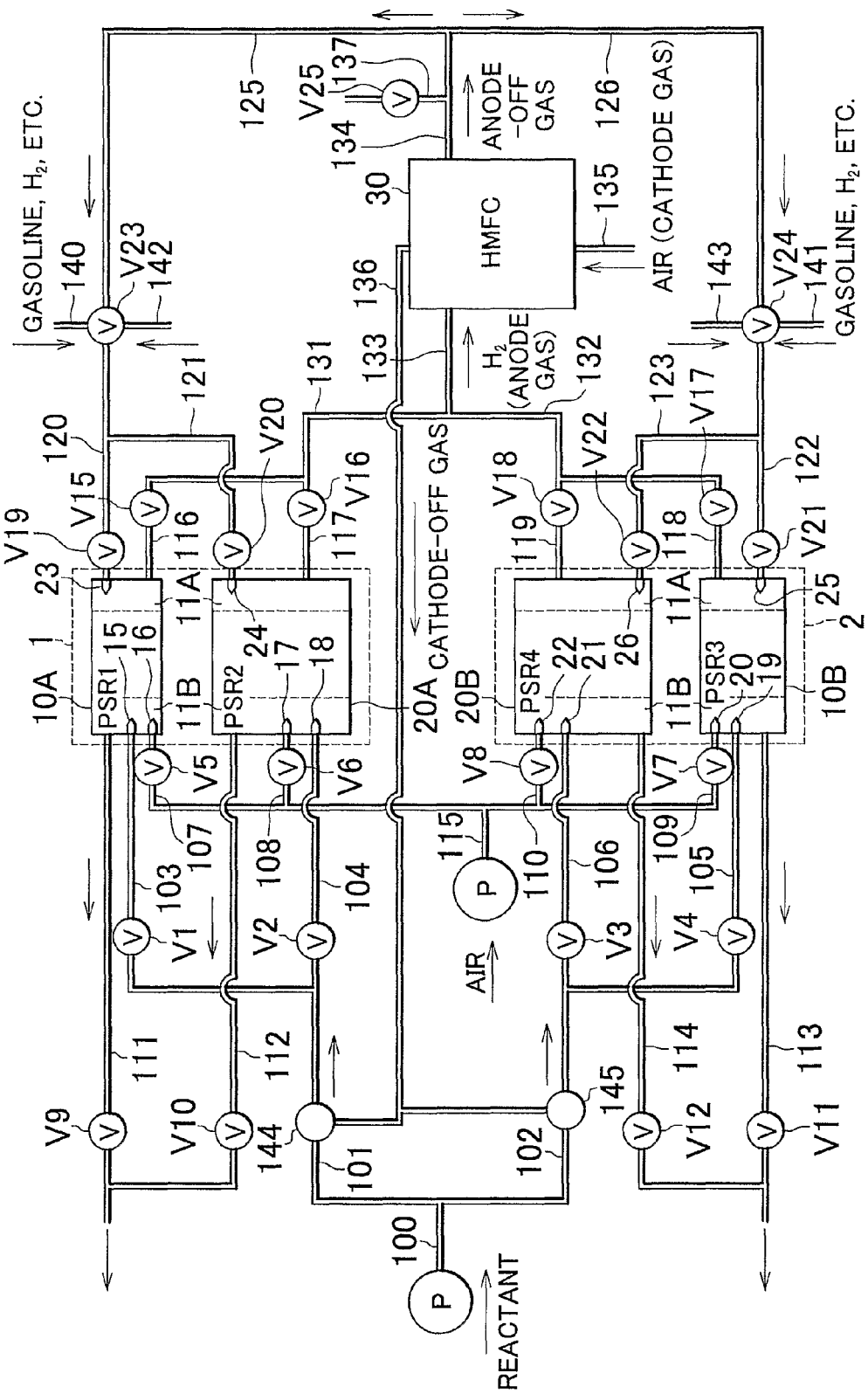
FIG. 1 illustrates a schematic diagram showing the configuration of a fuel cell system according to a first embodiment of the invention.

As shown in FIG. 1, the hydrogen generation device according to the embodiment is provided with catalysts and injection devices. The hydrogen generation device includes a PSR device 1; a PSR device 2; and an HMFC 30. The PSR device 1 includes a first PSR reformer (PSR1) 10A and a second PSR reformer (PSR2) 20A. The PSR device 2 includes a third PSR reformer (PSR3) 10B and a fourth PSR reformer (PSR4) 20B. The reforming reaction and the recovery reaction can be carried out alternately in each of the first PSR reformer 10A and the second PSR reformer 20A. When the reforming reaction is carried out in one of the first PSR reformer 10A and the second PSR reformer 20A, the recovery reaction is carried out in the other. The reforming reaction and the recovery reaction can also be carried out alternately in each of the third PSR reformer 10B and the fourth PSR reformer 20B. When the reforming reaction is carried out in one of the third PSR reformer 10B and the fourth PSR reformer 20B, the recovery reaction is carried out in the other. Hydrogen generated by each PSR reformer is supplied to the HMFC 30 so that the HMFC 30 can generate electric power. Valves are provided in passages connected to the reformers and the HMFC 30. The valves function as switching devices that are controlled by a control device to automatically change connection between the passages and the reformers or the HMFC 30.

In this embodiment, the reforming reaction and the recovery reaction are carried out alternately in each of the PSR reformer 10A and the PSR reformer 20A in the PSR device 1. When the reforming reaction is carried out in one of the PSR reformers 10A and 20A, the recovery reaction is carried out in the other. The reforming reaction and the recovery reaction are carried out alternately in each of the PSR reformer 10B and the PSR reformer 20B in the PSR device 2. When the reforming reaction is carried out in one of the PSR reformers 10B and 20B, the recovery reaction is carried out in the other. The control device automatically controls a plurality of valves (valves V1 to V8, and valves V15 to V22) to supply the appropriate material, in this case, at least the reactant or exothermic material, depending on the reaction carried out in the particular reformer. The valves switch among supply passages through which the reactant is supplied to the PSR reformers. The valves also switch among supply passages through which the anode off-gas from the HMFC 30 is supplied to the PSR reformers. Furthermore, the valves switch among discharge passages through which hydrogen-rich gas generated is discharged from the PSR reformers, as well as supply passages through which oxygen-containing gas, such as air, is supplied to the PSR reformers. The air is supplied to each PSR reformer mainly during warming-up operation.

The PSR device 1 and the PSR device 2 have the same configuration. The heat capacity "p" of the first PSR reformer 10A is smaller than the heat capacity "q" of the second PSR reformer 20A (p<q). The heat capacity "r" of the third PSR reformer 10B is smaller than the heat capacity "s" of the fourth PSR reformer 20B (r<s). The heat capacity "p" of the first PSR reformer 10A is substantially equal to the heat capacity "r" of the third PSR reformer 10B. The heat capacity "q" of the second PSR reformer 20A is substantially equal to the heat capacity "s" of the fourth PSR reformer 20B. Accordingly, in the case where all the reformers are heated, the temperature of the PSR reformers 10A and 10B reaches the reforming-start temperature more quickly than that of the PSR reformers 20A and 20B. Therefore, the reforming reaction is preferentially carried out in the PSR reformers 10A and 10B.

An injection device 15 and an injection device 16 are fitted to one end of the first PSR reformer 10A. The injection device 15 injects the reactant. The injection device 16 supplies air when a combustion reaction is carried out for warming-up of the reformers. Hereinafter, the term "combustion reaction" refers to the combustion reaction that is carried out for warming-up of the reformers when the fuel cell system is started. The term "combustion reaction" also refers to the recovery reaction. The first PSR reformer 10A is connected to a supply pipe 103 provided with the valve V1 and an air supply pipe 107 provided with the valve V5 via the injection devices 15 and 16, respectively. The first PSR reformer 10A is also connected to a discharge pipe 111 provided with the valve V9.

An injection device 18 and an injection device 17 are fitted to one end of the second PSR reformer 20A. The injection device 18 injects the reactant. The injection device 17 supplies air when the combustion reaction is carried out in the reformer. The second PSR reformer 20A is connected to a supply pipe 104 provided with the valve V2 and an air supply pipe 108 provided with the valve V6 via the injection devices 18 and 17, respectively. The second PSR reformer 20A is also connected to a discharge pipe 112 provided with the valve V10.

The supply pipes 103 and 104 are connected to a supply pipe 100 via a pipe 101 provided with a mixer 144. Gasoline is supplied through the supply pipe 100. Instead of gasoline, the mixture of gasoline vapor and water vapor may be supplied through the supply pipe 100, if necessary. The supply pipes 107 and 108 are connected to an air supply pipe 115. A pump is fitted to an end of the air supply pipe 115, and air obtained from the atmosphere is supplied through the air supply pipe 115. By opening the valve V1 and V2 alternately, opening valves V5 and V6 alternately, and valves V9 and V10 alternately in the automatic manner, the reactant and/or air may be selectively supplied to the PSR reformer where the reforming reaction is carried out, and gas generated by the recovery reaction is discharged from the PSR reformer where the recovery reaction is carried out.

At this time, water vapor in cathode off-gas discharged from the HMFC 30 through a discharge pipe 136 (described later) is mixed with gasoline vapor to form the reactant. Then, the reactant is supplied to the PSR reformer where the reforming reaction is carried out.

Similarly, an injection device 19 and an injection device 20 are fitted to one end of the third PSR reformer 10B. The injection device 19 injects the reactant. The injection device 20 supplies air when the combustion reaction is carried out. The third PSR reformer 10B is connected to a supply pipe 105 provided with the valve V4 and an air supply pipe 109 provided with the valve V7 via the injection devices 19 and 20, respectively. The third PSR reformer 10B is also connected to a discharge pipe 113 provided with the valve V11.

An injection device 21 and an injection device 22 are fitted to one end of the fourth PSR reformer 20B. The injection device 21 injects the reactant. The injection device 22 supplies air when the combustion reaction is carried out. The fourth PSR reformer 20B is connected to a supply pipe 106 provided with the valve V3 and an air supply pipe 110 provided with the valve V8 via the injection devices 21 and 22, respectively. The fourth PSR reformer 20B is also connected to a discharge pipe 114 provided with the valve V12.

The supply pipes 105 and 106 are connected to the supply pipe 100 via a pipe 102 provided with a mixer 145. Gasoline may be supplied through the supply pipe 100. Instead of gasoline, the mixture of gasoline vapor and water vapor may be supplied through the supply pipe 100, if necessary. Also, the supply pipes 109 and 110 are connected to the air supply pipe 115. The pump is fitted to the end of the air supply pipe 115, and air obtained from the atmosphere is supplied through the air supply pipe 115. By opening the valve V3 and V4 alternately, valves V7 and V8 alternately, and valves V11 and V12 alternately in the automatic manner, the reactant and/or air may be selectively supplied to the PSR reformer where the reforming reaction is to be carried out, and the gas generated by the recovery reaction is discharged from the PSR reformer where the recovery reaction is carried out.

A discharge pipe 116 provided with the valve V15 is connected to the other end of the first PSR reformer 10A. The hydrogen-rich gas that is generated by the reforming reaction is discharged through the discharge pipe 116. Further, the first PSR reformer 10A is provided with an injection device 23 that injects anode off-gas discharged from the HMFC 30. The injection device 23 may inject the anode off-gas with gasoline, hydrogen gas, and the like, if necessary. The first PSR reformer 10A is connected to a supply pipe 120 provided with the valve V19 via the injection device 23.

A discharge pipe 117 provided with the valve V16 is connected to the other end of the second PSR reformer 20A. The hydrogen-rich gas that is generated by the reforming reaction is discharged through the discharge pipe 117. Further, the second PSR reformer 20A is provided with an injection device 24 that injects the anode off-gas discharged from the HMFC 30. The injection device 24 may inject the anode off-gas with gasoline, hydrogen gas, and the like, if necessary. The second PSR reformer 20A is connected to a supply pipe 121 provided with the valve V20 via the injection device 24.

The discharge pipes 116 and 117 are connected to a hydrogen supply pipe 133 via a pipe 131. The hydrogen-rich gas generated by each PSR reformer is supplied to the HMFC 30 through the hydrogen supply pipe 133. Supply pipes 120 and 121 are connected to a supply pipe 125. The anode off-gas discharged from the HMFC 30 is supplied to the PSR reformers 10A and 20A through the supply pipe 125. By opening the valves V15 and V16 alternately, and opening the valves V19 and V20 alternately in the automatic manner, the anode off-gas is selectively supplied to the PSR reformer where the recovery reaction is carried out. The anode off-gas may be supplied along with gasoline, hydrogen gas, and the like, if necessary. Also, the hydrogen-rich gas generated and discharged from the PSR reformer where the reforming reaction is carried out is supplied to the HMFC 30. The HMFC 30 uses the hydrogen-rich gas to generate electric power.

The configuration of the third and fourth PSR reformers is the same as that of the first and second PSR reformers. A discharge pipe 118 provided with the valve V17 is connected to the other end of the third PSR reformer 10B. The hydrogen-rich gas that is generated by the reforming reaction is discharged through the discharge pipe 118. Further, the third PSR reformer 10B is provided with an injection device 25 that injects the anode off-gas discharged from the HMFC 30. The injection device 25 may inject the anode off-gas with gasoline, hydrogen gas, and the like, if necessary. The third PSR reformer 10B is connected to a supply pipe 122 provided with the valve V21 via the injection device 25.

A discharge pipe 119 provided with the valve V18 is connected to the other end of the fourth PSR reformer 20B. The hydrogen-rich gas that is generated by the reforming reaction is discharged through the discharge pipe 119. The fourth PSR reformer 20B is provided with an injection device 26. The injection device 26 injects the anode off-gas supplied from the HMFC 30. The injection device 26 may inject the anode off-gas with gasoline, hydrogen gas, and the like, if necessary. The fourth PSR reformer 20B is connected to a supply pipe 123 provided with the valve 22 via the injection device 26.

The discharge pipes 118 and 119 are connected to the hydrogen supply pipe 133 via a pipe 132. The hydrogen-rich gas that is generated by each PSR reformer is supplied to the HMFC 30 through the hydrogen supply pipe 133. The supply pipes 122 and 123 are connected to an end of a supply pipe 126. The anode off-gas discharged from the HMFC 30 is supplied to the PSR reformers 10B and 20B through the supply pipe 126. The anode off-gas may be supplied along with gasoline, hydrogen gas, and the like, if necessary. By opening the valves V17 and V18 alternately, and opening the valves V21, and V22 alternately in the automatic manner, the anode off-gas is selectively supplied to the PSR reformer where the recovery reaction is carried out. The anode off-gas may be supplied along with gasoline, hydrogen gas, and the like, if necessary. Also, the hydrogen-rich gas generated and discharged from the PSR reformer where the reforming reaction is carried out is supplied to the HMFC 30. The HMFC 30 uses the hydrogen-rich gas to generate electric power.

The injection devices 15, 18, 19, and 21 inject the reactant in a wide range in the respective PSR reformers when the combustion reaction for warming-up or the reforming reaction is carried out, for example, when the fuel cell system is started, or during the transition time (e.g., when the load on the HMFC 30 sharply increases). Also, the injection devices 16, 17, 20, and 22 inject air (oxygen-containing gas) with the reactant in a wide range in the respective PSR reformers when the combustion reaction or the reforming reaction (partial oxidation reaction) is carried out, for example, when the fuel cell system is started, or during the transition time. By injecting the mixture of air and the reactant, the combustion reaction or reforming reaction is carried out on catalysts 12 provided in the respective PSR reformers.

The injection devices 23 to 26 inject the anode off-gas in a wide range in the respective PSR reformers so that the recovery reaction is carried out on the catalysts 12 provided in the respective PSR reformers. The injection devices 23 to 26 may inject the anode off-gas with gasoline, hydrogen gas, and the like, if necessary.

The hydrogen supply pipe 133 or the pipes 131 and 132 may be connected to a hydrogen storage tank (for example, a hydrogen storage device) which is separately provided, and where surplus hydrogen-rich gas is stored. With this configuration, hydrogen can be taken out from the hydrogen storage tank and the amount of hydrogen can be appropriately increased and decreased when the fuel cell system is started, when the fuel cell is operated under low loads, or when the required amount of hydrogen changes due to a change in the load (for example, during the transition time). Also, by temporarily changing the amount of hydrogen supplied, the amount of hydrogen in the anode off-gas supplied to the PSR reformers can be appropriately increased and decreased.

The supply pipes 125 and 126 are provided with a valve V23 and a valve V24, respectively. The supply pipe 125 is connected to an external supply pipe 140 and an air supply pipe 142 via the valve V23. The supply pipe 126 is connected to an external supply pipe 141 and an air supply pipe 143 via the valve V24. In addition to the anode off-gas supplied through the supply pipes 125 and 126, gasoline, hydrogen gas, and the like can be supplied from the outside of the fuel cell system through the external supply pipes 140 and 141. Also, air for burning hydrogen and the like in the anode off-gas is supplied through the air supply pipes 142 and 143, whereby the amount of air is controlled.

Each of the supply pipes 125 and 126 may be provided with a throttle valve that adjusts the amount of anode off-gas, and a hydrogen buffer tank (for example, a hydrogen storage device, a high-pressure hydrogen tank, or the like). In this case, by operating the throttle valve, or supplying hydrogen from the hydrogen buffer tank, the amount of hydrogen supplied to each PSR reformer can be controlled irrespective of the operating state of the fuel cell when the fuel cell generates electric power.

The anode side (hydrogen-electrode side) of the HMFC 30 is connected to the hydrogen supply pipe 133, and a discharge pipe 134 through which the anode off-gas is discharged. The discharge pipe 134 is connected to the supply pipes 125 and 126. The cathode side (oxygen-electrode side) of the HMFC 30 is connected to an air supply pipe 135 and a discharge pipe 136. Air (oxidant gas) containing a high proportion of oxygen is supplied through the air supply pipe 135, and is used to generate electric power. The cathode off-gas generated by the fuel cell reaction is discharged through the discharge pipe 136. A discharge pipe 137 is connected to a certain portion of the discharge pipe 134. The discharge pipe 137 is provided with a valve V25. The anode off-gas can be discharged to the outside of the fuel cell system by opening the valve V25 if necessary, to prevent supply of the anode off-gas that is not sufficiently heated, for example, during warming-up of the PSR reformer.

The HMFC 30 generates electric power when the hydrogen (hydrogen-rich gas) that is generated by the reforming reaction and air are supplied to the HMFC 30. After electric power is generated, the anode off-gas and the cathode off-gas are discharged from the HMFC 30. Further, the anode off-gas that is discharged from the HMFC 30 can be supplied mainly to the PSR reformers where the recovery reaction is carried out through the discharge pipe 134, and the supply pipes 125 and 126. Also, the anode off-gas is discharged to the outside of the fuel cell system through the discharge pipe 137, if necessary.

Also, the discharge pipe 136 is connected to a certain portion of each of the pipes 101 and 102 via the mixers 144 and 145. The moisture and remaining oxygen contained in the cathode off-gas are circulated and used in the reforming reaction. Accordingly, gasoline and the cathode off-gas are mixed by each mixer to form the mixed gas, and the mixed gas is supplied to each PSR reformer. This configuration is effective when the amount of moisture is small, for example, when the fuel cell system is started or when the fuel cell is operated under low loads. This configuration is also effective when a great amount of water vapor needs to be supplied to the PSR reformer where the reforming reaction is carried out, that is, the amount of hydrogen that needs to be generated by the reforming reaction increases due to the increase in the amount of hydrogen required in the fuel cell, for example, when the load on the HMFC 30 sharply increases.

A cooling pipe may extend through the HMFC 30. In this case, cooling air (cooling medium) obtained from the atmosphere is supplied through the cooling pipe so that the inside of the HMFC 30 is cooled through heat exchange. This cooling pipe may be connected to the supply pipes through which the anode off-gas is supplied (for example, the supply pipes 125, 126, and the like), or may be directly connected to the PSR reformer where the recovery reaction is carried out. In this case, a temperature adjustment control and a flow rate control can be executed, and the air can be used for combustion when the recovery reaction is carried out.

Figure 2:
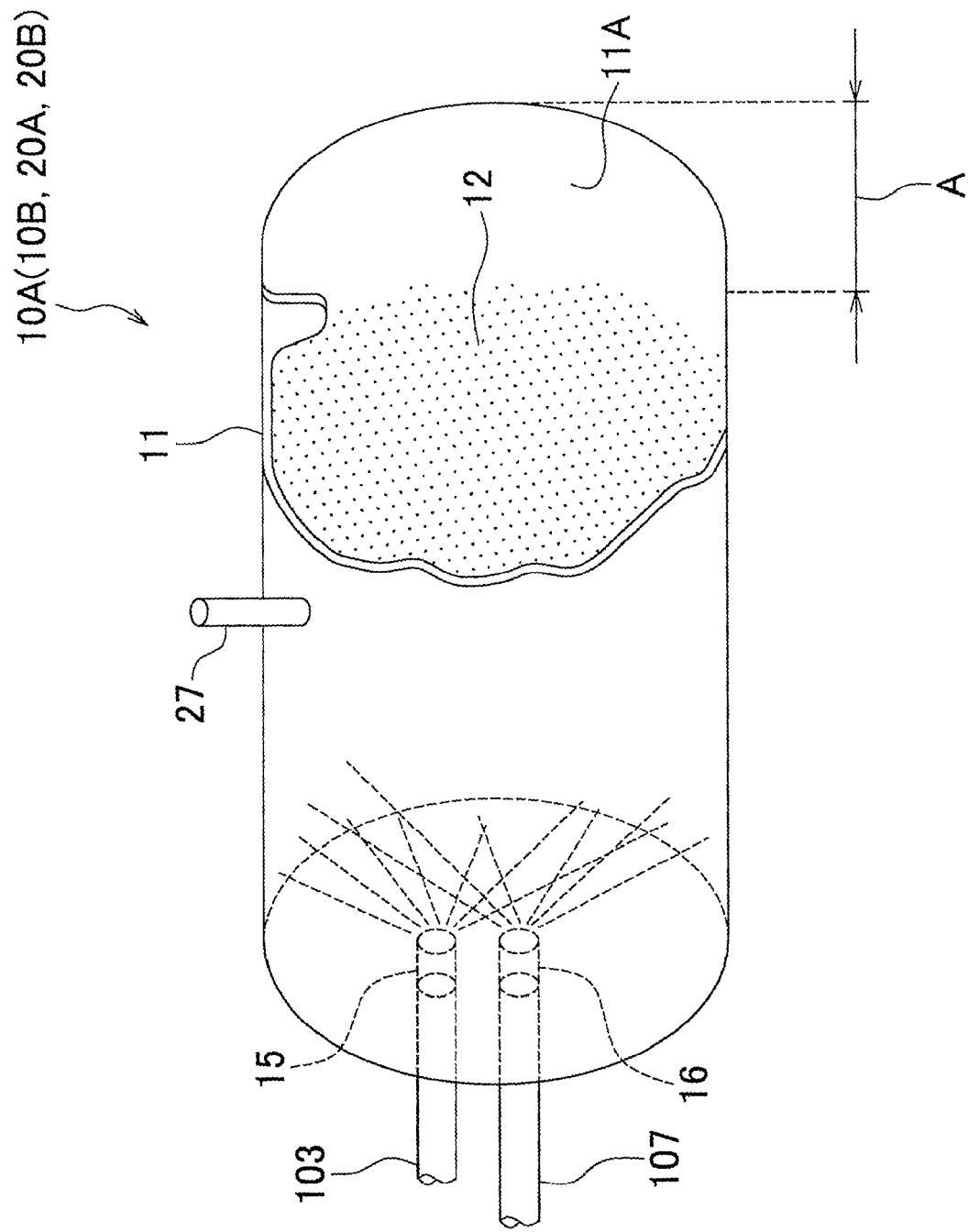
FIG. 2 illustrates a perspective view showing the schematic configuration of a PSR reformer according to the first embodiment of the invention.

The first to fourth PSR reformers (10A, 20A, 10B, and 20B) have the same configuration except for the respective heat capacities thereof. That is, as shown in FIG. 2, each PSR reformer includes a cylindrical body 11; and the catalyst (catalyst support portion) 12. The cylindrical body 11 has a cross section of a circle. The both ends in the longitudinal direction of the cylindrical body 11 are closed. The catalyst 12 is supported at the inner wall surface of the cylindrical body 11. The cylindrical body 11 has a space where the reaction is carried out, and also supports the body of the catalyst.

The cylindrical body 11 is formed to have a cylindrical shape using ceramic honeycomb. The cylindrical body 11 has the cross section of a circle having a diameter of 10 cm. The cylindrical body 11 is a hollow body. The both ends in the longitudinal direction of the cylindrical body 11 are closed. The cross section of the cylindrical body 11 may have any other shape such as a rectangle and an oval, according to the purpose. Also, the size of the cylindrical body 11 may be modified according to the purpose.

In a curved surface of the inner wall of the cylindrical body 11, regions having a predetermined width A at both sides in the longitudinal direction are referred to as "catalyst free regions 11A and 11B" (refer to FIG. 1). The catalyst 12 is not supported in the catalyst free regions 11A and 11B. That is, the catalyst 12 is supported in the entire surface of the inner wall of the cylinder body 11, except the catalyst free regions 11A and 11B. The catalyst 12 may be formed using metals such as Pd, Ni, Pt, Rh, Ag, Ce, Cu, La, Mo, Mg, Sn, Ti, Y, and Zn.

When the reforming reaction is carried out on the catalyst 12 using the reactant, the hydrogen-rich gas that is generated by the reforming reaction is cooled at the catalyst free region 11A at the downstream side in the direction where the hydrogen-rich gas is discharged. Therefore, the temperature of the hydrogen-rich gas is brought close to the operating temperature of the HMFC 30. When the reforming reaction switches to the recovery reaction, the temperature of the catalyst free region 1A has become high due to heat exchange with the hydrogen-rich gas. Therefore, the anode off-gas that is supplied in the direction opposite to the direction where the hydrogen-rich gas is discharged can be preheated at the catalyst free region 11A before the anode off-gas is supplied to the catalyst 12. As a result, temperature distribution is formed such that the amount of stored heat increases toward the center of the cylindrical body 11 where the catalyst 12 is supported. This is advantageous for promoting the reaction. A temperature sensor 27 that measures the temperature of the catalyst 12 is fitted to the cylindrical body 11.

In this embodiment, basically, the first PSR reformer 10A is paired with the second PSR reformer 20A. The reforming reaction and the recovery reaction are carried out alternatively in each of the first PSR reformer 10A and the second PSR reformer 20A. When the reforming reaction is carried out in one of the PSR reformers 10A and 20A, the recovery reaction is carried out in the other PSR reformer. Also, the third PSR reformer 10B is paired with the fourth PSR reformer 20B. The reforming reaction and the recovery reaction are carried out alternately in each of the third PSR reformer 10B and the fourth PSR reformer 20B. When the reforming reaction is carried out in one of the PSR reformers 10B and 20B, the recovery reaction is carried out in the other PSR reformer.

Figure 3:
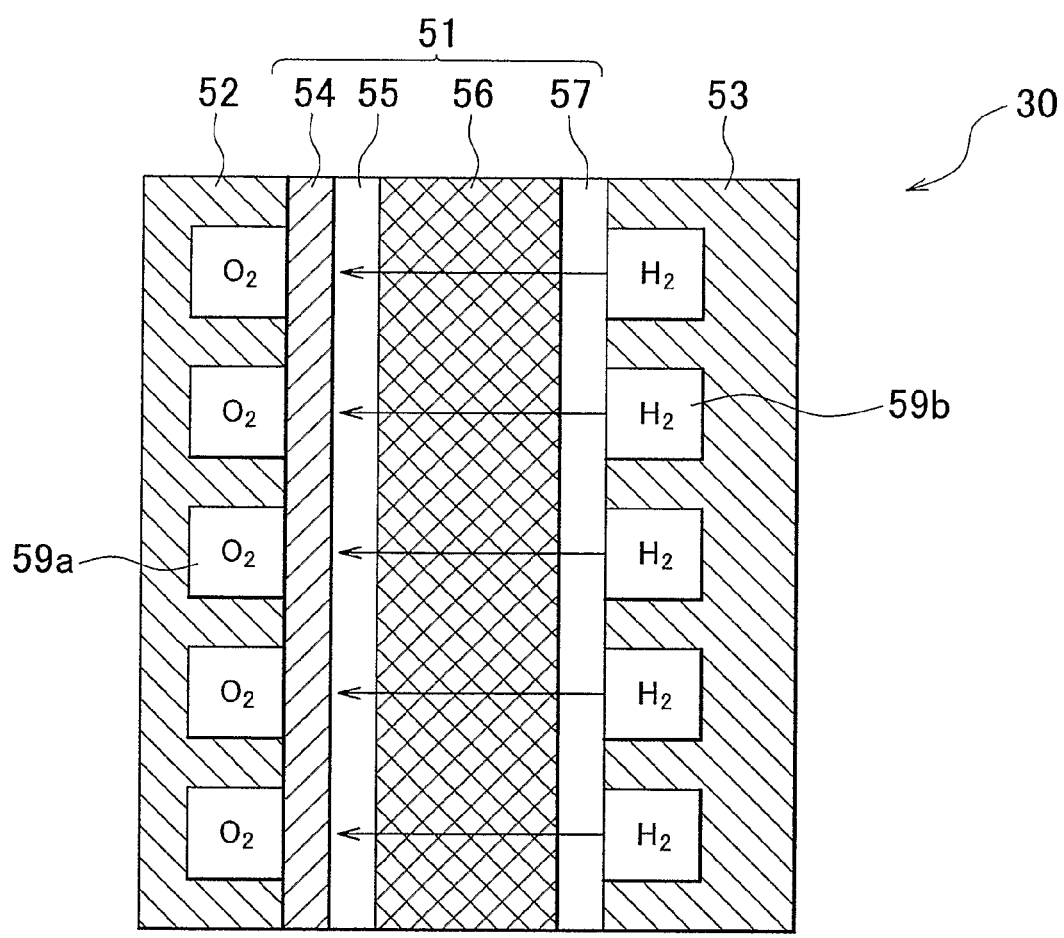
FIG. 3 illustrates a schematic cross sectional view showing a hydrogen membrane fuel cell (HMFC) according to the first embodiment of the invention.

As shown in FIG. 3, the HMFC 30 includes an electrolyte membrane 51; an oxygen electrode ($O_2$ electrode) 52; and a hydrogen electrode ($H_2$ electrode) 53. The electrolyte membrane 51 includes dense hydrogen-permeable layers made of hydrogen-permeable metal. The electrolyte membrane 51 is provided between the oxygen electrode 52 and the hydrogen electrode 53. When the hydrogen-rich gas generated by each PSR reformer is supplied to the HMFC 30, hydrogen is selectively allowed to pass through the electrolyte membrane 51 so that electric power is generated.

Air passages 59a are formed between the oxygen electrode 52 and the electrolyte membrane 51. Air that serves as the oxidant gas passes through the air passages 59a. That is, air is supplied and discharged through the air passages 59a. Hydrogen passages 59b are formed between the hydrogen electrode 53 and the electrolyte membrane 51. The hydrogen-rich gas passes through the hydrogen passages 59b. That is, the hydrogen-rich gas is supplied and discharged through the hydrogen passages 59b. Each of the oxygen electrode 52 and the hydrogen electrode 53 may be formed using various materials such as carbon (for example, carbon powder that supports platinum or alloy of platinum and another metal) or electrolyte solution (for example, Nafion Solution produced by Aldrich Chemical Company).

The electrolyte membrane 51 has four layers that include a dense substrate 56 made of vanadium (V). The dense substrate 56 is a dense hydrogen-permeable metal layer. The substrate 56 is provided between palladium (Pd) layers 55, 57. The Pd layers 55, 57 are dense hydrogen-permeable metal layers. A thin electrolyte layer 54 made of solid oxide (BaCeO$_3$) is provided on the surface of the Pd layer 55, which does not contact the substrate 56.

The substrate 56 may be formed using niobium, tantalum, or alloy containing at least one of niobium and tantalum, instead of vanadium (V). They have high hydrogen permeability, and are not expensive.

The electrolyte layer 54 may be formed using an SrCeO$_3$-based ceramic proton conductor, instead of BaCeO$_3$.

Examples of hydrogen-permeable metal include palladium, vanadium, niobium, tantalum, alloy containing at least one of vanadium, niobium, and tantalum, and palladium alloy. By providing the dense layers made of such hydrogen-permeable metal, the electrolyte membrane can be protected.

Preferably, the dense layer (coating) near the oxygen electrode is formed using vanadium (vanadium itself or alloy containing vanadium such as vanadium-nickel), niobium, tantalum, or alloy containing at least one of niobium and tantalum, because these metals have high hydrogen permeability and are not expensive in general. The dense layer near the hydrogen electrode can be formed using any one of these metals. However, these metals may cause hydrogen embrittlement. Therefore, preferably, the dense layer near the hydrogen electrode is formed using palladium or palladium alloy. Palladium and palladium alloy have high hydrogen permeability and are unlikely to cause hydrogen embrittlement.

Figure 9:
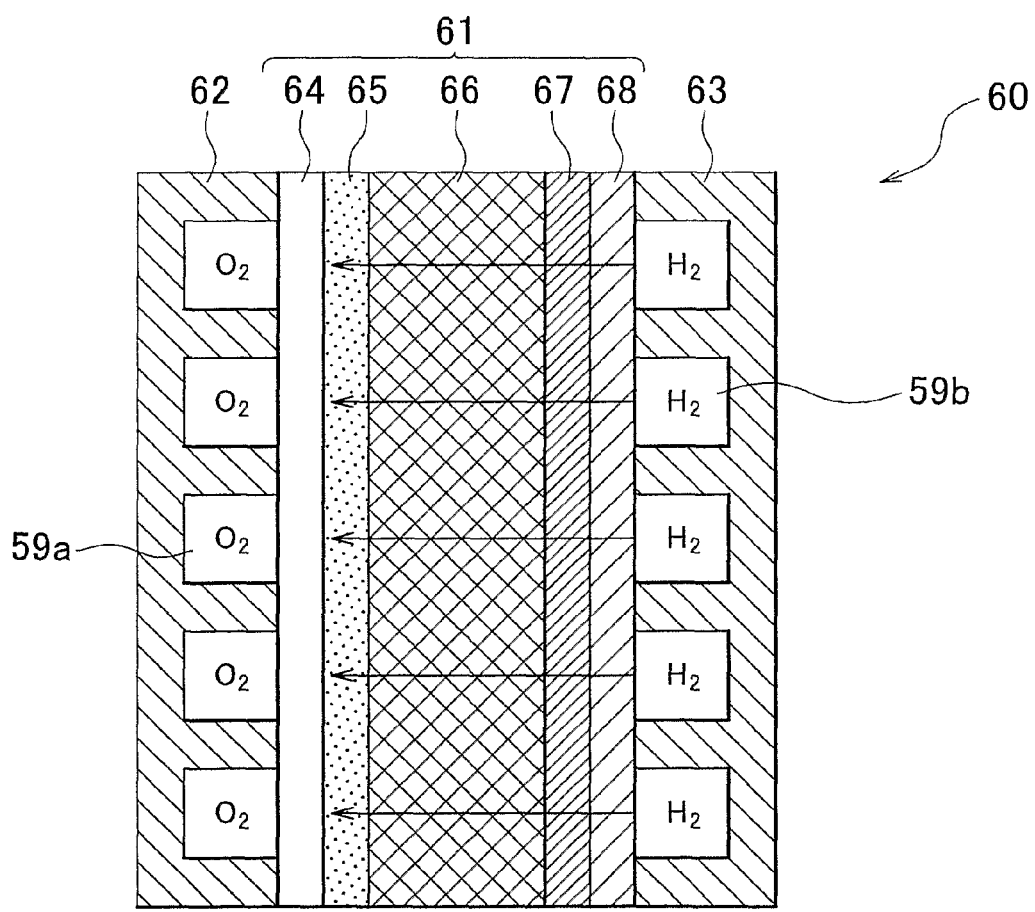
FIG. 9 illustrates a schematic cross sectional view showing another example of the fuel cell that constitutes the fuel cell system according to the invention.
Figure 10:
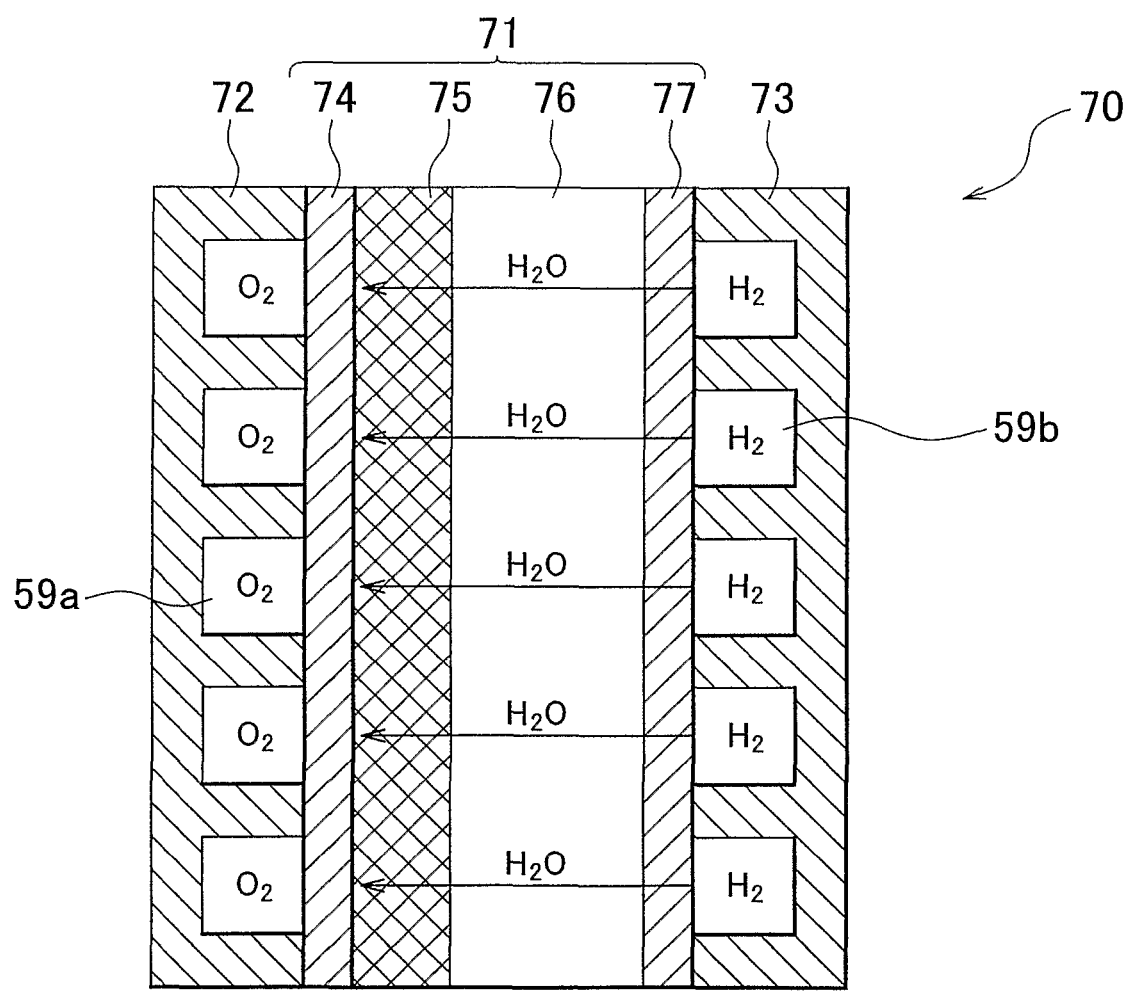
FIG. 10 illustrates a schematic cross sectional view showing yet another example of the fuel cell that constitutes the fuel cell system according to the invention.

In the case where the Pd layer 55, the substrate 56, and the Pd layer 57 are stacked, that is, two or more layers made of different metals (dense hydrogen-permeable metal layers) are stacked as shown in FIG. 3, a metal-diffusion suppression layer that suppresses diffusion of different metal ions may be provided in at least a portion of an interface between the different metals (refer to FIG. 9 and FIG. 10). The metal-diffusion suppression layer is described in the paragraphs [0015] to [0016] in Japanese Patent Application Publication No. JP-A-2004-146337.

Instead of stacking the palladium layer (Pd layer), the vanadium layer (V layer), and the palladium layer (Pd layer) as described above, five layers may be stacked. For example, the Pd layer, a tantalum layer (Ta layer), a V layer, a Ta layer, and a Pd layer may be stacked in the order stated. As described above, the speed at which protons or hydrogen atoms pass through vanadium is higher than the speed at which protons or hydrogen atoms pass through palladium. Also, vanadium is less expensive than palladium. However, vanadium has low ability to decompose a hydrogen molecule into a proton and the like, as compared to palladium. Therefore, by providing the Pd layer that has high ability to decompose the hydrogen molecule to the proton and the like on one surface or both surfaces of the V layer, the hydrogen permeability can be increased. In this case, by providing the metal-diffusion suppression layer between the metal layers, diffusion of the different metal ions and a decrease in the hydrogen permeability can be suppressed. Accordingly, a decrease in the electromotive force of the HMFC can be suppressed.

The electrolyte layer 54 is made of solid oxide. A reaction suppression layer that suppresses the reaction of oxygen atoms in the electrolyte layer 54 with Pd may be provided in at least a portion of the interface between the electrolyte layer 54 and the Pd layer 55 (refer to a reaction suppression layer 65 in FIG. 9). The reaction suppression layer is described in the paragraphs [0024] to [0025] in Japanese Patent Application Publication No. JP-A-2004-146337.

The electrolyte membrane 51 includes the dense vanadium substrate that is hydrogen-permeable, and the inorganic electrolyte layer that is formed adjacent to the cathode of the HMFC 30. Therefore, the electrolyte membrane can be made thin. By employing this configuration, the operating temperature of a solid oxide fuel cell (SOFC), which is generally high, can be decreased to the temperature range of 300 to 600° C. As a result, in the fuel cell system according to the invention, the cathode off-gas discharged from the HMFC 30 can be directly supplied to each PSR reformer where the reforming reaction is carried out.

When the hydrogen-rich gas that has high hydrogen (H$_2$) density is supplied to the hydrogen passages 59b and air containing oxygen (O$_2$) is supplied to the air passages 59a, the electrochemical reactions represented by equations (1) to (3) are carried out in the HMFC 30 (that is, the fuel cell reaction is carried out), and electric power is supplied to the outside of the HMFC 30. The equation (1) represents the reaction in the anode, the equation (2) represents the reaction in the cathode, and the equation (3) represents all the reactions in the HMFC 30.

$$H_2 \rightarrow 2H^+ + 2e^- \tag{1}$$

$$(\tfrac{1}{2})O_2 + 2H^+ + 2e^- \rightarrow H_2O \tag{2}$$

$$H_2 + (\tfrac{1}{2})O_2 \rightarrow H_2O \tag{3}$$

Figure 4:
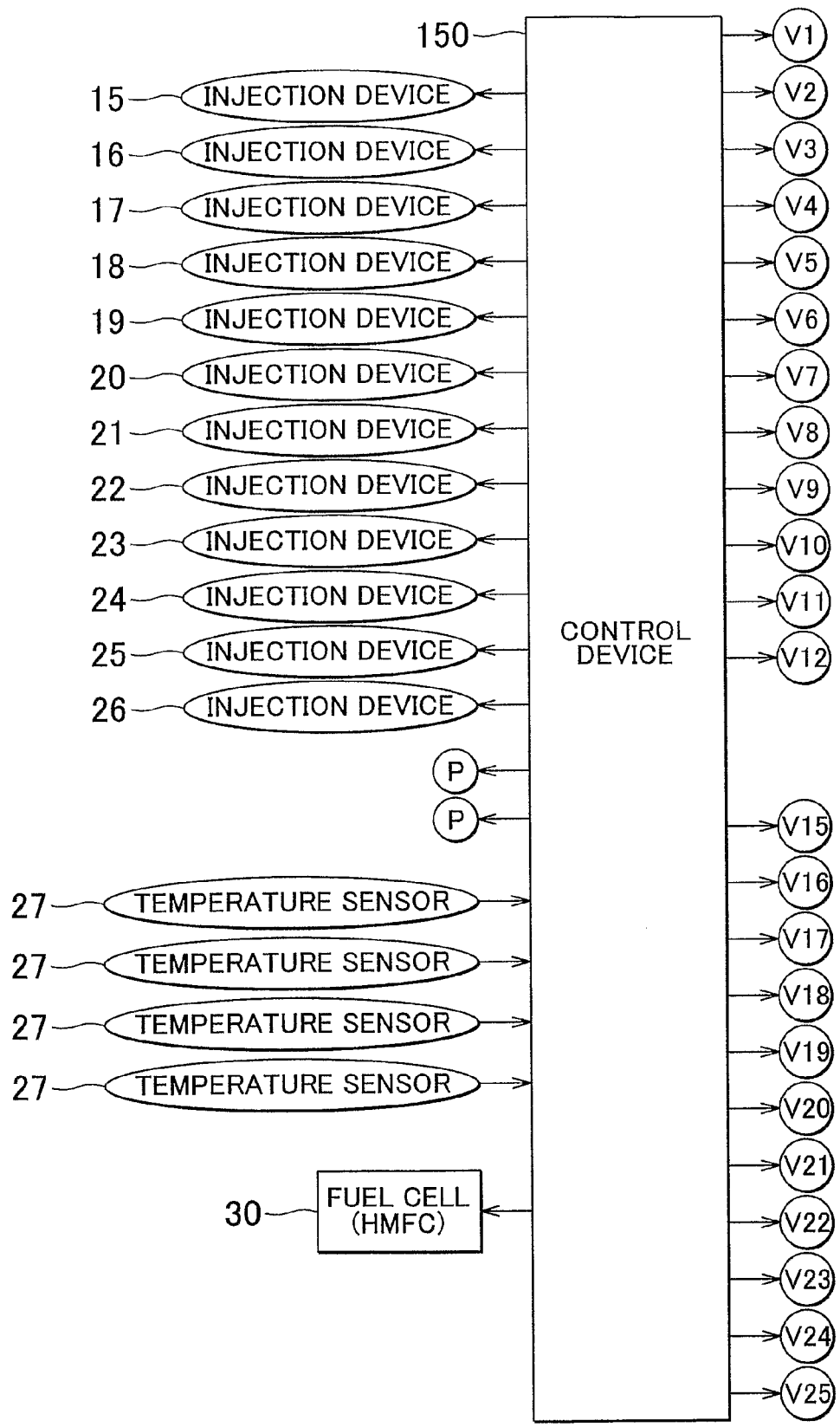
FIG. 4 illustrates a block diagram showing a control device according to the first embodiment of the invention.

As shown in FIG. 4, the PSR reformers 10A and 20A (PSR device 1), the PSR reformers 10B and 20B (PSR device 2), the HMFC 30, the pump P, the valves V1 to V12, V15 to V25, the injection devices 15 to 26, and the like are electrically connected to a control device 150. The control device 150 controls the operation timing of each of these devices. The control device 150 executes an ordinary operation control for the HMFC 30 to generate electric power. That is, the control device 150 controls the output of the HMFC 30 by adjusting the amount of hydrogen gas and air according to the magnitude of loads (not shown) connected to the HMFC 30. Also, the control device 150 executes a control for the warming-up operation of each PSR reformer when the fuel cell system is started or during the transition time, for example, when the load on the HMFC 30 sharply changes. Further, the control device 150 executes a reaction control to switch between the reforming reaction and the recovery reaction during ordinary operation.

In this embodiment, after the ignition switch is turned on, the PSR reformers where the reforming reaction should be started are selected among the four PSR reformers, based on the known heat capacities of the four PSR reformers. Then, on the basis of values detected by the temperature sensors, gasoline and air are supplied to the selected PSR reformers, and the combustion reaction is carried out in the selected PSR reformers for warming-up of the PSR reformers. Alternatively, the reforming reaction is started in the selected PSR reformers without heating the PSR reformers. Then, the ordinary operation starts, that is, the reforming reaction and the recovery reaction are carried out in alternate PSR reformers of each PSR device.

Figure 5:
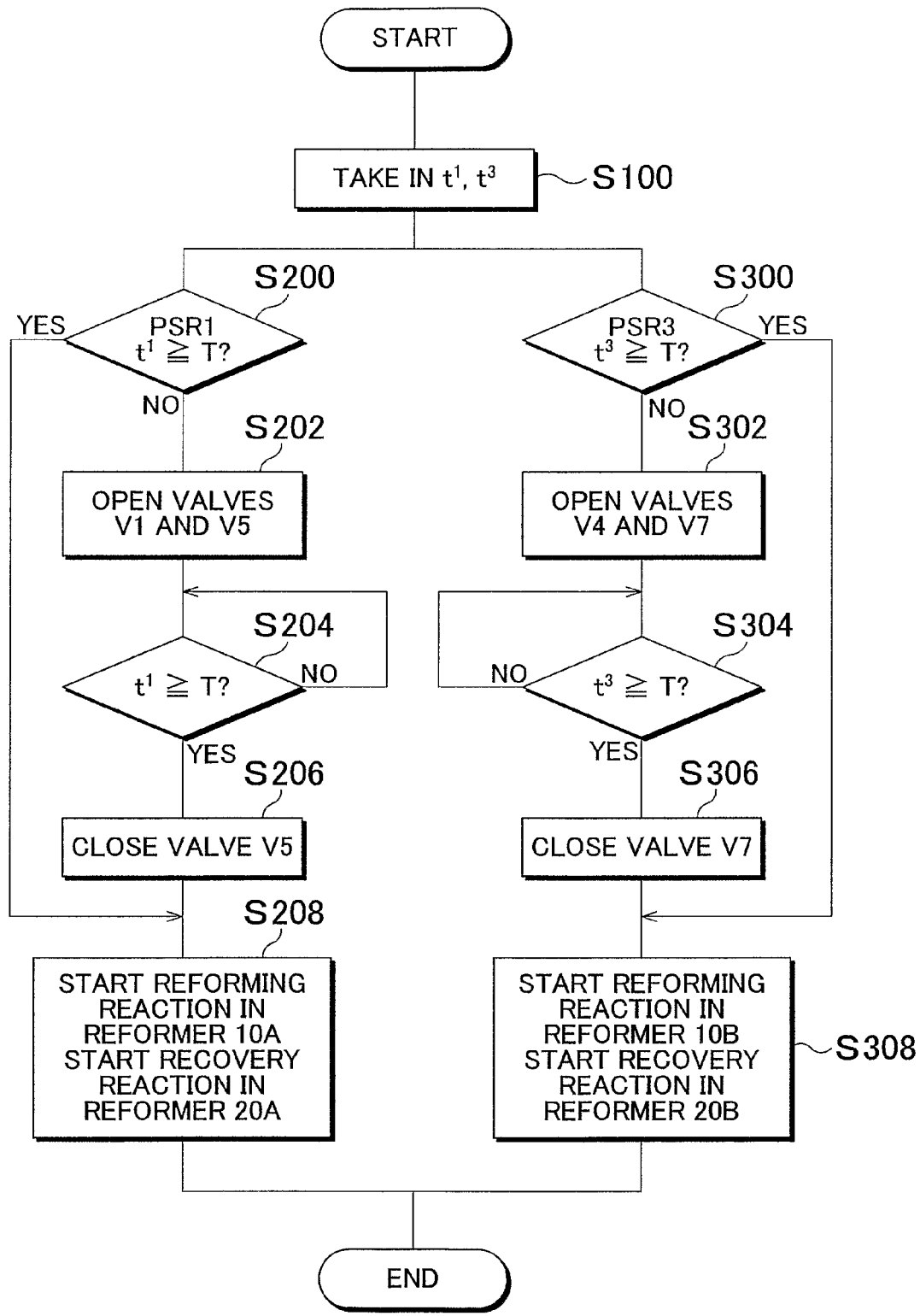
FIG. 5 illustrates a flowchart of a reaction control routine that executes a reforming reaction control based on heat capacities and catalyst temperatures when the fuel cell system according to the first embodiment of the invention is started.

Hereinafter, a reaction control routine relating to the reforming reaction that is executed by the control device 150 will be described in detail. FIG. 5 shows the reaction control routine that controls the reforming reaction based on the heat capacities and the catalyst temperatures when the fuel cell system is started.

The PSR reformers 10A and 10B have the heat capacity smaller than that of the PSR reformers 20A and 20B. Therefore, the temperature of the PSR reformers 10A and 10B reaches the reforming-start temperature more quickly than that of the PSR reformers 20A and 20B. Accordingly, when the routine is started, first, in step S100, the PSR reformers 10A and 10B are selected, and a catalyst temperature $t^1$ in the PSR reformer 10A and a catalyst temperature $t^3$ in the PSR reformer 10B are detected by the respective temperature sensors, and are taken into the control device 150.

Next, in step S200, it is determined whether the catalyst temperature $t^1$ has reached a reforming-start temperature T. In step S300, it is determined whether the catalyst temperature $t^3$ has reached the reforming-start temperature T.

If it is determined that the catalyst temperature $t^1$ has not reached the reforming-start temperature T in step S200, the temperature of the catalyst in the PSR reformer 10A needs to be raised to the reforming-start temperature T. Therefore, in step S202, the valves V1 and V5 are opened, and gasoline and air are supplied to the PSR reformer 10A so that the combustion reaction is carried out in the PSR reformer 10A for warming-up of the PSR reformer 10A. In this step, the valve V15 is also opened for warming the HMFC 30 at the same time. Further, the valves V10 and V20 are opened for warming the PSR reformer 20A at the same time. The valves V2 and V6, the valve V9, the valve V16, and the valve V19 are closed.

In step S204, it is determined again whether the catalyst temperature $t^1$ has reached the reforming-start temperature T due to combustion. If it is determined that the catalyst temperature $t^1$ has reached the reforming-start temperature T, the valve V5 is closed in step S206. Next, in step S208, the reforming reaction is started in the PSR reformer 10A. At this time, the valve V1, the valve V10, the valve V15, and the valve V20 remain open. The valve V2, the valve V9, the valve V6, the valve V16, and the valve V19 are closed. The recovery reaction is started in the PSR reformer 20A.

In step S300, it is determined whether the catalyst temperature $t^3$ has reached the reforming-start temperature T. If it is determined that the catalyst temperature $t^3$ has not reached the reforming-start temperature T in step S300, the temperature of the PSR reformer 10B needs to be increased to the reforming-start temperature T. Therefore, in step S302, the valves V4 and V7 are opened, and gasoline and air are supplied so that the combustion reaction is carried out in the PSR reformer 10B for warming-up. In this step, the valve V17 is also opened for warming the HMFC 30 at the same time. Further, the valves V12 and V22 are opened for warming the PSR reformer 20A at the same time. The valves V3, V8, V11, V18, and V21 are closed.

In step S304, it is determined again whether the catalyst temperature $t^3$ has reached the reforming-start temperature T. If it is determined that the catalyst temperature $t^3$ has reached the reforming-start temperature T, the valve V7 is closed in step S306. Then, in step S308, the reforming reaction is started in the PSR reformer 10B. At this time, the valves V4, V12, V17, and V22 remain open. The valves V3, V11, V8, V18, and V21 are closed. The recovery reaction is started in the PSR reformer 20B. Then, this routine ends.

If it is determined that the catalyst temperature $t^1$ or $t^3$ has not reached the reforming-start temperature T in step S204 or S304, the PSR reformer 10A or 10B continues to be warmed by combustion (that is, warming-up operation continues) until the catalyst temperature $t^1$ or $t^3$ reaches the reforming-start temperature T.

If it is determined that the catalyst temperature $t^1$ has reached the reforming-start temperature T in step S200, it is determined that the reforming reaction can be started in the PSR reformer 10A. Therefore, in step S208, the valves V1, V15, V20, and V10 are opened on the PSR device 1 side so that reforming reaction is carried out in the PSR reformer 10A. Also, the recovery reaction is carried out in the PSR reformer 20A. If it is determined that the catalyst temperature $t^3$ has reached the reforming-start temperature T in step S300, it is determined that the reforming reaction can be started in the PSR reformer 10B. Therefore, in step S308, the valves V4, V17, V22, and V12 are opened on the PSR device 2 side so that reforming reaction is carried out in the PSR reformer 10B. Also, the recovery reaction is carried out in the PSR reformer 20B. Then, this routine ends.

In the aforementioned routine, the gas that is generated by the recovery reaction in the PSR reformers 20A and 20B is discharged to the outside of the fuel cell system through the discharge pipes 112 and 114, respectively.

As described above, when the fuel cell system is started, the reforming reaction is carried out in the PSR reformers where the catalyst temperature reaches the reforming-start temperature more quickly than in the other PSR reformers, based on the known heat capacities and the detected catalyst temperatures. Also, the PSR reformers where the catalyst temperature reaches the reforming-start temperature quickly, the other PSR reformers, and the HMFC 30 are warmed at the same time. Therefore, the reforming reaction for generating hydrogen can be started in a short time after the fuel cell system is started. This greatly improves startability of the hydrogen generation device. Also, in the embodiment, there is a difference in the heat efficiency among the plurality of PSR reformers. Therefore, sufficient hydrogen can be sharply generated when the amount of hydrogen required sharply increases, for example, when the load on the HMFC 30 sharply increases.

After the reforming reaction and the recovery reaction are started in the PSR reformers, and the routine ends as described above, the ordinary operation starts. That is, as described above, first, the reforming reaction is started in the PSR reformers 10A and 10B, and the recovery reaction is started in the PSR reformers 20A and 20B. The valves V1, V15, V20, V10, V4, V17, V22, and V12 remain open. Therefore, communication is permitted between the supply pipes 100 and 103, between the discharge pipe 116 and the hydrogen supply pipe 133, and between the supply pipe 121 and the supply pipe 125. Also, communication is permitted between the supply pipes 100 and 105, between the discharge pipe 118 and the hydrogen supply pipe 133, and between the supply pipe 123 and the supply pipe 126. The reactant is supplied to the PSR reformers 10A and 10B so that the reforming reaction is carried out. Also, the anode off-gas (exothermic material) discharged from the HMFC 30 is supplied to the PSR reformers 20A and 20B so that the recovery reaction is carried out.

Because the combustion reaction is carried out for warming-up (warming-up operation is performed) in the PSR reformers 10A and 10B, the amount of heat has increased in the PSR reformers 10A and 10B before the reforming reaction is started. Therefore, when the reactant is injected to the catalyst 12 from each of the injection devices 15 and 19, the steam-reforming reaction is carried out using gasoline, whereby synthetic gas (hydrogen-rich gas) is generated. Preferably, the reforming reaction is carried out at the temperature of 300° C. to 1100° C.

The hydrogen-rich gas that is thus generated by the reforming reaction is cooled in advance in the respective catalyst free regions 11A. The catalyst free region 11A of the PSR reformer 10A is connected to the discharge pipe 116, and the catalyst free region 11A of the PSR reformer 10B is connected to the discharge pipe 118. Then, the hydrogen-rich gas is supplied to the anode of the HMFC 30 through the hydrogen supply pipe 133 connected to the discharge pipes 116 and 118. At this time, air is supplied through the air supply pipe 135 provided at the cathode side of the HMFC 30. Thus, the HMFC 30 generates electric power (i.e., the fuel cell reaction is carried out). After the supplied hydrogen rich-gas is consumed to generate electric power, the anode off-gas is discharged to the discharge pipe 134. Then, the anode off-gas passes through the supply pipes 125 and 126, and the supply pipes 121 and 123, and is injected from the injection devices 24 and 26. The anode off-gas mainly contains remaining hydrogen that is not used in the fuel cell reaction, CO, and $CH_4$.

At this time, the amount of anode off-gas used for combustion may be small. In this case, a sufficient amount of heat cannot be stored, or heat cannot be stored in a short time. Therefore, the state of the valve V23 and/or the state of the valve V24 may be changed so that communication is permitted between the external supply pipe 140 and the supply pipe 125, and/or between the external supply pipe 141 and the supply pipe 126. As a result, gasoline, hydrogen gas, and the like can be additionally supplied. Accordingly, a sufficient amount of heat can be stored by combustion promptly, when the amount of water vapor in the cathode off-gas is small, for example, when the fuel cell system is started, when the fuel cell is operated under low loads, or when the load on the HMFC 30 sharply increases.

Similarly, susceptible air for burning hydrogen and the like in the anode off-gas is supplied through the air supply pipes 142 and/or 143 by changing the state of the valve V23 and/or the state of the valve V24.

When the anode off-gas is supplied to the PSR reformers 20A and 20B from the injection devices 24 and 26, the hydrogen and the like are burned on the respective catalysts 12, whereby the amount of heat stored by the combustion can be increased, that is, the catalyst temperature can be increased in the PSR reformers 20A and 20B. The temperature of the catalyst free region 11A of the PSR reformer 20, to which the anode off-gas and the like are supplied, has been increased by the reforming reaction before the recovery reaction is carried out, as described above. Therefore, heat is returned to the catalyst 12 due to heat exchange with the supplied anode off-gas and the like when the recovery reaction is carried out. That is, heat can be effectively used.

In the case where the amount of stored heat decreases, that is, the catalyst temperature decreases, and therefore, the efficiency in generating hydrogen decreases in at least one of the PSR reformers 10A and 10B where the reforming reaction is carried out, the following control is executed according to a decrease in the amount of heat stored in each of the PSR reformers 10A and 10B. The reforming reaction is switched to the recovery reaction in the PSR reformer 10A, and the recovery reaction is switched to the reforming reaction in the PSR reformer 20A. Also, the reforming reaction is switched to the recovery reaction in the PSR reformer 10B, and the recovery reaction is switched to the reforming reaction in the PSR reformer 20B.

More specifically, the valves V1, V15, V20, and V10 are closed, and the valves V2, V16, V19, and V9 are opened on the PSR device 1 side. As a result, communication is permitted between the supply pipe 100 and the supply pipe 104, between the discharge pipe 117 and the hydrogen supply pipe 133, and between the supply pipe 120 and the supply pipe 125. Also, the valves V4, V17, V22, and V12 are closed, and the valves V3, V18, V21, and V11 are opened on the PSR device 2 side. As a result, communication is permitted between the supply pipe 100 and the supply pipe 106, between the discharge pipe 119 and the hydrogen supply pipe 133, and between the supply pipe 122 and the supply pipe 126.

At this time, the reactant is supplied to the PSR reformers 20A and 20B to carry out the reforming reaction. The anode off-gas discharged from the HMFC 30 is supplied to the PSR reformers 10A and 10B to carry out the recovery reaction. The reforming reaction and the recovery reaction may be switched to each other in the PSR device 1 and the PSR device 2 simultaneously or independently.

In the case where the reforming reaction and the recovery reaction are switched to each other in the aforementioned manner, the amount of stored heat has increased due to the recovery reaction before the reforming reaction is carried out in each of the PSR reformers 20A and 20B. Therefore, when the reactant passes through the supply pipes 104 and 106, and is injected to the respective catalysts 12 from the injection devices 18 and 21, the steam-reforming reaction is carried out using gasoline on the respective catalysts 12, whereby synthetic gas (hydrogen-rich gas) is generated. Preferably, the reforming reaction is carried out at the temperature of 300 to 1100° C., as described above. The hydrogen-rich gas that is thus generated by the reforming reaction in the PSR reformers 20A and 20B is cooled in advance in the respective catalyst free regions 11A. The catalyst free region 11A of the PSR reformer 20A is connected to the discharge pipe 117, and the catalyst free region 11A of the PSR reformer 20B is connected to the discharge pipe 119. Then, the hydrogen-rich gas is supplied to the anode of the HMFC 30 through the hydrogen supply pipe 133 connected to the discharge pipes 117 and 119. Also, air is supplied from the air supply pipe 135. Thus, the HMFC 30 generates electric power (i.e., the fuel cell reaction is carried out). After the supplied hydrogen rich-gas is consumed to generate electric power, the anode off-gas is discharged to the discharge pipe 134. Then, the anode off-gas passes through the supply pipes 125 and 126, and the supply pipes 120 and 122, and is injected from the injection devices 23 and 25.

As described above, the state of the valve V23 and/or the state of the valve V24 may be changed so that communication is permitted between the external supply pipe 140 and the supply pipe 125, and/or between the external supply pipe 141 and the supply pipe 126. As a result, gasoline for combustion, hydrogen gas, and the like can be additionally supplied. Similarly, air for burning hydrogen and the like in the anode off-gas is supplied through the air supply pipes 142 and/or 143 by changing the state of the valve V23 and/or the state of the valve V24.

The anode off-gas is supplied to the PSR reformers 10A and 10B from the injection devices 23 and 25, and the hydrogen and the like are burned on the respective catalysts 12, whereby the amount of heat stored by the combustion can be increased again, that is, the catalyst temperature can be increased again in the PSR reformers 10A and 10B. The temperature of the catalyst free regions 11A of the PSR reformers 10A and 10B, to which the anode off-gas and the like are supplied, has been increased by the reforming reaction before the recovery reaction is carried out, as described above. Therefore, heat returns to the catalyst 12 due to heat exchange with the supplied anode off-gas and the like when the recovery reaction is carried out. That is, heat can be effectively used.

In the aforementioned embodiment, after the ordinary operation starts, the control may be executed so that the reforming reaction is carried out in the PSR reformers 20A and 20B, and the reforming reaction is temporarily carried out also in the PSR reformers 10A and 10B to increase the amount of hydrogen generated by the reforming reaction, for example, during the transition time (e.g., when the load on the HMFC 30 sharply increases).

Also, in the aforementioned embodiment, the PSR reformer 10A is paired with the PSR reformer 20A, and the PSR reformer 10B is paired with the PSR reformer 20B. The reforming reaction and the recovery reaction are carried out alternately in each of the paired PSR reformers. When the reforming reaction is carried out in one of the paired PSR reformers, the recovery reaction is carried out in the other PSR reformer. However, the PSR reformers 20A and 20B, which have the heat capacity greater than that of the PSR reformers 10A and 10B, may be paired with each other. In this case, when the reforming reaction is carried out in one of the PSR reformers 20A and 20B, the recovery reaction is carried out in the other PSR reformer. The PSR reformers 10A and 10B may be paired with each other such that when the reforming reaction is carried out in one of the PSR reformers 10A and 10B, the recovery reaction is carried out in the other PSR reformer. Alternatively, the operation of PSR reformers 10A and 10B may be stopped.

In this embodiment, the first PSR reformer 10A is paired with the second PSR reformer 20A, and the third PSR reformer 10B is paired with the fourth PSR reformer 20B. However, the control may be executed without pairing the PSR reformers. For example, when the fuel cell system is started, the reforming reaction may be started in one PSR reformer where the catalyst temperature reaches the reforming-start temperature most quickly, and the recovery reaction may be carried out in the other three PSR reformers.

A fuel cell system according to a second embodiment will be described with reference to FIG. 6. In the second embodiment, when the fuel cell system is started, the PSR reformers where the reforming reaction should be started are selected based on the known heat capacities of the PSR reformers without using the values detected by the temperature sensors, and the reforming reaction is forcibly started in the selected PSR reformers.

The reactant and the exothermic material that are used in the first embodiment can be used also in the second embodiment. The same and corresponding components as those in the first embodiment will be denoted by the same reference numerals, and detailed description thereof will be omitted.

In this embodiment, when the ignition switch is turned on, gasoline and air are selectively and automatically supplied to the PSR reformers 10A and 10B which have the heat capacity smaller than that of the PSR reformers 20A and 20B. After the combustion is forcibly carried out in the PSR reformers 10A and 10B for warming-up, the reforming reaction is started in the PSR reformers 10A and 10B.

Figure 6:
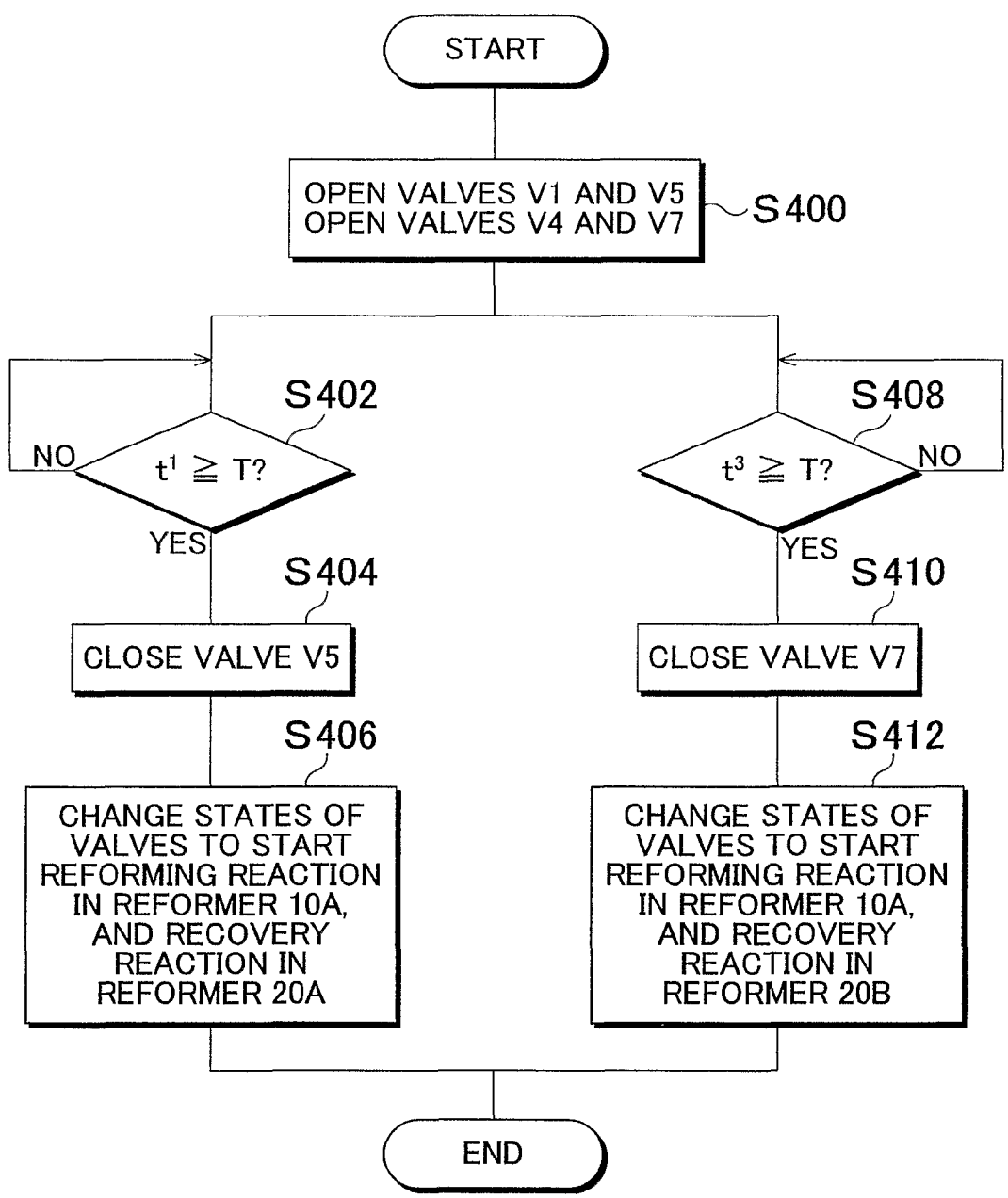
FIG. 6 illustrates a flowchart of a reaction control routine that executes a reforming reaction control based on heat capacities when a fuel cell system according to a second embodiment of the invention is started.

FIG. 6 shows a reaction control routine that controls the reforming reaction based on the heat capacities when the fuel cell system is started. In the PSR reformers 10A and 10B which have the heat capacity smaller than that of the PSR reformers 20A and 20B, the catalyst temperature reaches the reforming-start temperature by warming-up more quickly than in the PSR reformers 20A and 20B. Accordingly, when this routine is started, first, in step S400, the valves V1 and V5 on the PSR device 1 side, and the valves V4 and V7 on the PSR device 2 side are opened, and gasoline and air are forcibly supplied to the PSR reformers 10A and 10B. As a result, the combustion reaction is carried out using gasoline, and heating (warming-up) of the PSR reformers 10A and 10B is started.

At this time, the valves V15 and V17 are opened for warming the HMFC 30 at the same time. Further, the valves V10 and V20, and the valves V12 and V22 are opened for warming the PSR reformers 20A and 20B.

Next, in step S402, it is determined whether the temperature $t^1$ of the catalyst 12 in the PSR reformer 10A that is detected by the temperature sensor has reached the reforming-start temperature T ($t^1 \geq T$). Also, in step S408, it is determined whether the temperature $t^3$ of the catalyst 12 in the PSR reformer 10B has reached the reforming-start temperature T ($t^3 \geq T$).

If it is determined that the temperature $t^1$ of the catalyst 12 has reached the reform start temperature T in step S402, it is determined that the reforming reaction can be started in the PSR reformer 10A. Therefore, the valve V5 is closed in step S404. Next, in step S406, the states of the valves are changed so that the reforming reaction is carried out in the PSR reformer 10A, and the recovery reaction is carried out in the PSR reformer 20A in the PSR device 1. More specifically, the valve 5 is closed. At this time, the valve V1 remains open.

If it is determined that the catalyst temperature $t^3$ has reached the reforming-start temperature T in step S408, it is determined that the reforming reaction can be started in the PSR reformer 10B. Therefore, the valve V7 is closed in step S410. Next, in step S412, the states of the valves are changed so that the reforming reaction is carried out in the PSR reformer 10B and the recovery reaction is carried out in the PSR reformer 20B in the PSR device 2. More specifically, the valve V7 is closed. At this time, the valve V4 remains open. Then, the routine ends.

If it is determined that the catalyst temperature $t^1$ or $t^3$ has not reached the reforming-start temperature T in step S402 or step S408, it is determined that the reforming reaction cannot be started in the PSR reformer 10A or 10B. Therefore, the PSR reformer 10A or 10B continues to be warmed by combustion (that is, warming-up operation is continued) until the catalyst temperature $t^1$ or $t^3$ reaches the reforming-start temperature T.

In this embodiment, when the fuel cell system is started, the initial temperatures of the catalysts are not detected, and the warming-up operation is forcibly started in the PSR reformers 10A and 10B by supplying gasoline and air to the PSR reformers 10A and 10B. Therefore, the reforming reaction for generating hydrogen can be started shortly after the fuel cell system is started. This greatly improves startability of the hydrogen generation device.

After the reforming reaction or the recovery reaction is started in each of the PSR reformers, the ordinary operation starts as in the first embodiment.

In this embodiment as well, after the ordinary operation starts, the control may be executed such that the reforming reaction is carried out in the PSR reformers 20A and 20B, and the reforming reaction is temporarily carried out also in the PSR reformers 10A and 10B to increase the amount of hydrogen generated by the reforming reaction, for example, during the transition time (e.g., when the load on the HMFC 30 sharply increases). Also, as in the first embodiment, the PSR reformers 20A and 20B, which have the heat capacity greater than that of the PSR reformers 10A and 10B, may be paired with each other. In this case, when the reforming reaction is carried out in one of the PSR reformers 20A and 20B, the recovery reaction is carried out in the other PSR reformer.

Also, in this embodiment, the first PSR reformer 10A is paired with the second PSR reformer 20A, and the third PSR reformer 10B is paired with the fourth PSR reformer 20B. However, the control may be executed without pairing the PSR reformers. For example, when the fuel cell system is started, the reforming reaction may be started in one PSR reformer in which the catalyst temperature reaches the reforming-start temperature most quickly, and the recovery reaction is carried out in the other three PSR reformers.

A fuel cell system according to a third embodiment of the invention will be described with reference to FIG. 7. In this embodiment, the PSR reformers where the reforming reaction should be started are selected based on the values detected by the temperature sensors when the fuel cell system is started, irrespective of the known heat capacities of the PSR reformers, and the reforming reaction is started in the selected PSR reformers.

The reactant and the exothermic material that are used in the first embodiment can be used also in the third embodiment. The same and corresponding components as those in the first embodiment will be denoted by the same reference numerals, and detailed description thereof will be omitted.

In this embodiment, when the ignition switch is turned on, the catalyst temperatures ($t^1$, $t^2$, $t^3$, and $t^4$) in all the four PSR reformers are detected, and the PSR reformers where the catalyst temperature has reached the reforming-start temperature quickly are preferentially selected, and reforming reaction is started in the selected PSR reformers.

Figure 7:
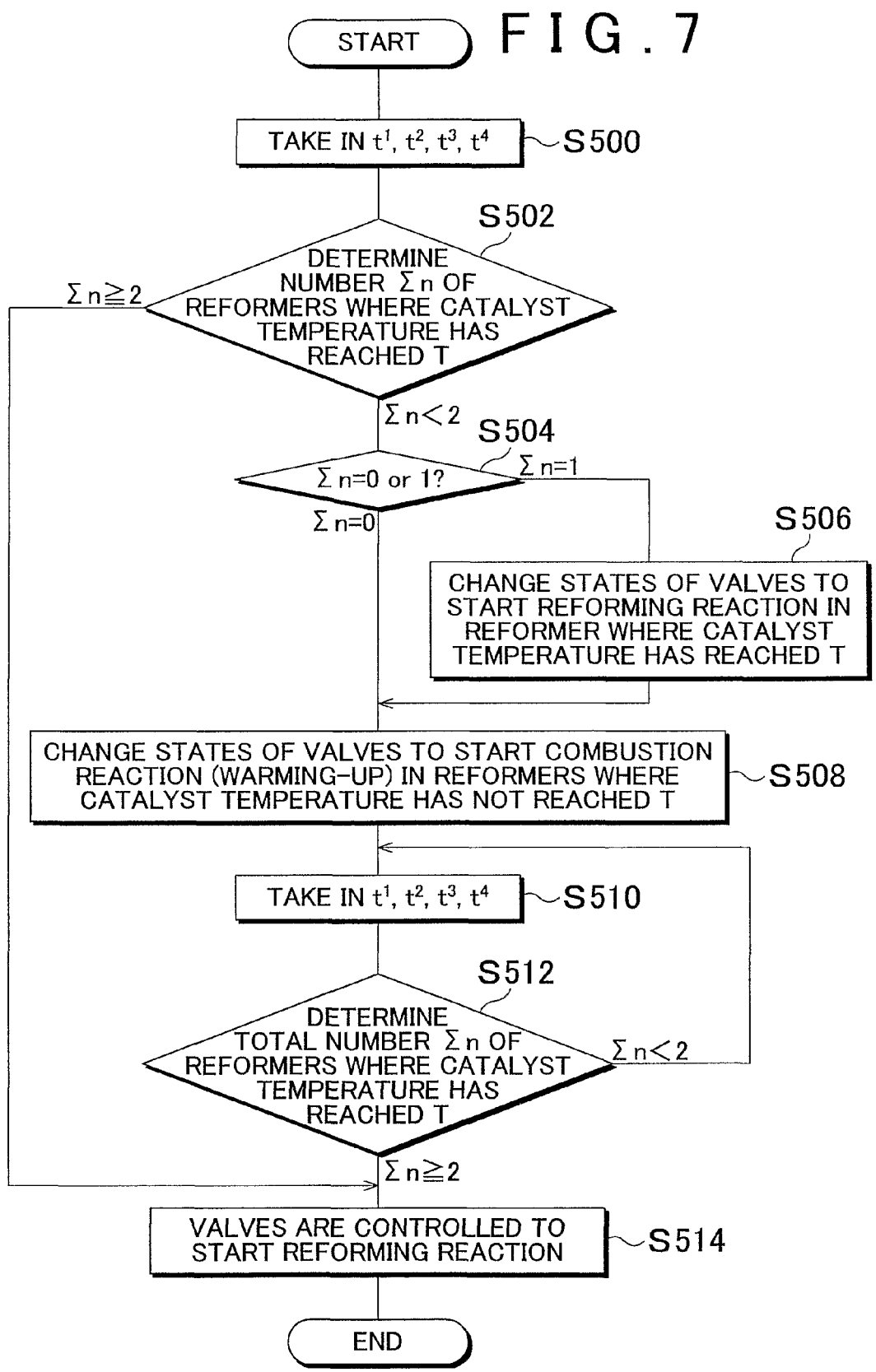
FIG. 7 illustrates a flowchart of a reaction control routine that executes a reforming reaction control based on catalyst temperatures when a fuel cell system according to a third embodiment of the invention is started.

FIG. 7 shows a reaction control routine that controls the reforming reaction based on the catalyst temperatures when the fuel cell system is started. When the routine is executed, the catalyst temperatures $t^1$, $t^2$, $t^3$, and $t^4$ in all the PSR reformers are taken into the control device 150 in step S500.

In step S502, on the basis of the catalyst temperatures ($t^1$, $t^2$, $t^3$, and $t^4$) that are taken into the control device 150, the total number ($\Sigma n$) of the PSR reformer(s) where the catalyst temperature has achieved the reforming-start temperature T is determined.

If it is determined that the total number ($\Sigma n$) is less than 2 in step S502, it is determined that the catalyst temperature ($t^1$ or $t^3$) in the PSR reformer 10A or 10B has reached the reforming-start temperature T, or the catalyst temperature has not reached the reforming-start temperature T in any PSR reformers. Accordingly, in step S504, it is determined whether the total number ($\Sigma n$) is 0 or 1. If it is determined that the total number ($\Sigma n$) is 1 in step S504, the routine proceeds to step S506. In step S506, the states of the valves are changed to adjust the pipe configuration so that the reforming reaction is started first in the PSR reformer where the catalyst temperature has reached the reforming-start temperature T. For example, if the catalyst temperature $t^1$ in the PSR reformer 10A has reached the reforming-start temperature T ($t^1 \geq T$), the valves V1, V15, V20, and V10 are opened to start the reforming reaction.

In this case, the temperature of the catalyst in only one of the four PSR reformers has reached the reforming-start temperature T (for example, PSR reformer 10A). Therefore, step S508 is performed.

If it is determined that the total number ($\Sigma n$) is 0 in step S504, all four PSR reformers are heated to bring the catalyst temperature to the reforming-start temperature T in two of the PSR reformers in step S508. More specifically, the valves V1 to V4, and the valves V5 to V8 are opened, and gasoline and air are supplied to all the PSR reformers 10A, 10B, 20A, and 20B. The combustion reaction is carried out in all the PSR reformers 10A, 10B, 20A, and 20B for warming-up. At this time, the valves V15 to V18 are also opened to discharge the combustion gas from the PSR reformers, and to warm the HMFC 30.

If the anode off-gas from the HMFC 30 has not been sufficiently heated when all the four PSR reformers are heated, the valve V25 is opened so that the anode off-gas is not introduced to the PSR reformers. Instead, the anode off-gas is discharged from the discharge pipe 137 extending from the discharge pipe 134.

If it is determined that the total number ($\Sigma n$) is 1 in step S504, the three other PSR reformers where the catalyst temperature has not reached the reforming-start temperature T are heated so that the catalyst temperature reaches the reforming-start temperature T in one of the three PSR reformers, in step S508. In this case, the supply passages to the three PSR reformers are opened in the aforementioned manner, whereby the combustion reaction is carried out in the three PSR reformers for warming-up of the PSR reformers. For example, if the catalyst temperature $t^1$ has reached the reforming-start temperature T ($t^1 \geq T$), the valves V2 to V4, and the valves V6 to V8 are opened so that gasoline and air are supplied to all the PSR reformers 10B, 20A, and 20B. The combustion reaction is carried out in the PSR reformers 10B, 20A, and 20B for warming-up of the PSR reformers.

Next, in step S510, the catalyst temperatures in the PSR reformers are taken into the control device 150 again (if the total number ($\Sigma n$) is 0, the catalyst temperatures in all the four PSR reformers are taken into the control device 150. If the total number ($\Sigma n$) is 1, the catalyst temperatures that have not reached the reforming-start temperature T in the three PSR reformers are taken into the control device 150). In step S512, the total number ($\Sigma n$) of the PSR reformers where the catalyst temperature has reached the reforming-start temperature T is determined, based on the catalyst temperatures that are taken into the control device 150.

If it is determined that the total number ($\Sigma n$) is 2 or greater in step S 512, the valves are controlled to open the supply passages in the manner described below in step S514. That is, the valves are controlled so that the reactant is supplied to at least two PSR reformers where the catalyst temperature has reached the reforming-start temperature T. Also, the valves are controlled so that the anode off-gas is supplied to the PSR reformers where the catalyst temperature has not reached the reforming-start temperature T. The valves are controlled in this manner if it is determined that the total number ($\Sigma n$) is 2 or greater in step S 502.

For example, (i) in the case where it is determined that the total number ($\Sigma n$) is 0 in step S504, and it is determined that both of the catalyst temperatures $t^1$ and $t^3$ in the PSR reformers 10A and 10B have reached the reforming-start temperature T ($t^1$, $t^3 \geq T$) in step S512, and (ii) in the case where the total number ($\Sigma n$) is 1, and it is determined that the catalyst temperature $t^3$ in the PSR reformer 10B has reached the reforming-start temperature T ($t^3 \geq T$) in step S504, the valves V1, V15, V20, and V10 are opened, and the valves V4, V17, V22, and V12 are opened. As a result, the reforming reaction is carried out in the PSR reformers 10A and 10B, and the recovery reaction is carried out in the PSR reformers 20A and 20B.

If it is determined that the total number ($\Sigma n$) is less than 2 in step S512, warming-up continues until it is determined that the total number ($\Sigma n$) is 2 or greater.

As described above, in the case where the reforming reaction is carried out when the fuel cell system is started, the reforming reaction can be started according to the operating state of the fuel cell system based on the values detected by the temperature sensors provided in the PSR reformers. For example, the fuel cell system can resume operation immediately after the fuel cell system is stopped (that is, the fuel cell system can be restarted when the temperatures of the catalysts have not greatly decreased yet). Accordingly, the reforming reaction for generating hydrogen can be started in a short time after the fuel cell system is started. This greatly improves startability of the hydrogen generation device.

After the reforming reaction or the recovery reaction is started in each of the PSR reformers, the ordinary operation starts as in the first embodiment. For example, in the case where the amount of stored heat decreases, that is, the catalyst temperature decreases, and therefore the efficiency in generating hydrogen by the reforming reaction decreases in the PSR reformer 10A and/or the PSR reformer 10B, a control (i) and/or a control (ii) described below are/is executed according to a decrease in the amount of heat stored in each of the PSR reformers 10A and 10B. In the control (i), the reforming reaction is switched to the recovery reaction in the PSR reformer 10A, and the recovery reaction is switched to the reforming reaction in the PSR reformer 20A. In the control (ii), the reforming reaction is switched to the recovery reaction in the PSR reformer 10B, and the recovery reaction is switched to the reforming reaction in the PSR reformer 20B.

In this embodiment as well, after the ordinary operation starts, the control may be executed such that the reforming reaction is carried out in the PSR reformers 20A and 20B, and the reforming reaction is temporarily carried out also in the PSR reformers 10A and 10B to increase the amount of hydrogen generated by the reforming reaction, for example, during the transition time (e.g., when the load on the HMFC 30 sharply increases). Also, as in the first embodiment, the PSR reformers 20A and 20B, which have the heat capacity greater than that of the PSR reformers 10A and 10B, may be paired with each other. In this case, when the reforming reaction is carried out in one of the PSR reformers 20A and 20B, the recovery reaction is carried out in the other PSR reformer.

As in the first embodiment, the control may be executed without pairing the first PSR reformer 10A with the second PSR reformer 20A, and paring the third PSR reformer 10B with the fourth PSR reformer 20B. For example, when the fuel cell system is started, the reforming reaction may be started in the PSR reformer in which the catalyst temperature reaches the reforming-start temperature most quickly, and the recovery reaction is carried out in the other three PSR reformers.

A fuel cell system according to a fourth embodiment of the invention will be described with reference to FIG. 8. In the first embodiment, two pairs of the PSR reformers are made such that each pair includes two PSR reformers that have different heat capacities. In this embodiment, two pairs of the PSR reformers are made such that each pair includes two PSR reformers that have substantially the same heat capacity.

The reactant and the exothermic material that are used in the first embodiment can be used also in the fourth embodiment. The same and corresponding components as those described in the first embodiment will be denoted by the same reference numerals, and detailed description thereof will be omitted.

As shown in FIG. 8, the hydrogen generation device according to the invention is provided with catalysts and injection devices. The hydrogen generation device includes the PSR device 1; the PSR device 2; and the HMFC 30. The PSR device 1 includes the first PSR reformer (PSR1) 10A and the third PSR reformer (PSR3) 10B. The PSR device 2 includes the second PSR reformer (PSR2) 20A and the fourth PSR reformer (PSR4) 20B. The reforming reaction and the recovery reaction are carried out alternately in each of the first PSR reformer (PSR1) 10A and the third PSR reformer (PSR3) 10B. When the reforming reaction is carried out in one of the first PSR reformer (PSR1) 10A and the third PSR reformer (PSR3) 10B, the recovery reaction is carried out in the other PSR reformer. The reforming reaction and the recovery reaction are carried out alternately in each of the second PSR reformer (PSR2) 20A and in the fourth PSR reformer (PSR4) 20B. When the reforming reaction is carried out in one of the second PSR reformer (PSR2) 20A and the fourth PSR reformer (PSR4) 20B, the recovery reaction is carried out in the other PSR reformer. Hydrogen generated by each PSR reformer is supplied to the HMFC 30 so that the HMFC 30 can generate electric power. Valves are provided in passages connected to the reformers and the HMFC 30. The valves function as switching devices that are controlled by the control device to automatically change connection between the passages and the reformers or the HMFC 30

The PSR device 1 and the PSR device 2 have the same configuration. The heat capacity "p" of the first PSR reformer 10A is substantially equal to the heat capacity "r" of the third PSR reformer 10B. The heat capacity "q" of the second PSR reformer 20A is substantially equal to the heat capacity "s" of the fourth PSR reformer 20B. The heat capacity of the PSR reformers 10A and 10B is smaller than that of the PSR reformers 20A and 20B (p, r<q, s).

Accordingly, in the case where all the PSR reformers are heated, the temperature of the PSR device 1 reaches the reforming-start temperature more quickly than that of the PSR device 2. Therefore, the reforming reaction is started in the PSR device 1 first.

The pipe configuration, operation after the fuel cell system is started, supply and discharge of the hydrogen-rich gas, the anode off-gas, and the like are the same as in the first embodiment.

In this embodiment, it is effective to heat each catalyst by using a heater such as an electric heater when the load on the HMFC 30 increases and the amount of hydrogen required in the HMFC 30 sharply increases. In this case, an electric heater or the like is provided near the catalyst 12 in each PSR reformer, and the catalyst is directly heated by turning the electric heater or the like ON in each PSR reformer where the reforming reaction is carried out. Directly heating the catalyst is effective in the case where the rate of the reforming reaction needs to be increased quickly, and the reforming reaction and the recovery reaction need to be switched to each other in a short period.

A heater such as an electric heater may be selectively provided at a region of the catalyst where the temperature becomes highest in each PSR reformer. The reforming reaction proceeds most quickly at the region where the temperature becomes highest. That is, the reaction speed does not change linearly depending on the temperature. The rate of the reforming reaction is increased abruptly at high temperatures. With this configuration, a region where the reaction is not promoted much by heating is not heated much. This increases heat energy efficiency.

In the fuel cell system according to the invention, a fuel cell can be selected according to the purpose or the like, from among hydrogen membrane fuel cells (HMFCs) that include an electrolyte membrane where an electrolyte layer is provided on at least one surface of a dense hydrogen-permeable metal membrane (layer). The HMFC may be a proton-conductive solid oxide fuel cell, or a proton-exchange membrane fuel cell.

For example, an HMFC (1) that includes an electrolyte membrane; a hydrogen electrode; a hydrogen supply-portion; an oxygen electrode; and an oxidant gas supply portion may be employed. In the HFMC (1), the electrolyte membrane includes a hydrogen-permeable metal layer, and an inorganic electrolyte layer (particularly, proton-conductive ceramic) that is provided on at least one surface of the hydrogen-permeable metal layer. The hydrogen electrode is provided on one surface of the electrolyte membrane. The hydrogen supply-portion supplies hydrogen to the hydrogen electrode. The oxygen electrode is provided on the other surface of the electrolyte membrane. The oxidant gas supply portion supplies oxidant gas to the oxygen electrode. Alternatively, a proton-exchange membrane HMFC (2) that includes an electrolyte membrane; a hydrogen electrode; a hydrogen supply-portion; an oxygen electrode; and an oxidant gas supply portion may be employed. In the HMFC (2), the electrolyte membrane includes a proton-conductive electrolyte layer, and hydrogen-permeable metal layers. The proton-conductive electrolyte layer is provided between the hydrogen-permeable metal layers. The hydrogen electrode is provided on one surface of the electrolyte membrane. The hydrogen supply-portion supplies hydrogen to the hydrogen electrode. The oxygen electrode is provided on the other surface of the electrolyte membrane. The oxidant gas supply portion supplies oxidant gas to the oxygen electrode.

FIG. 9 and FIG. 10 show other examples of the HMFC of the fuel cell system according to the invention. The examples of the HMFC are described in detailed in Japanese Patent Application Publication No. JP-A-2004-146337.

FIG. 9 shows an HMFC 60 that includes an electrolyte membrane 61; an oxygen electrode ($O_2$ electrode) 62; and a hydrogen electrode ($H_2$ electrode) 63. The HMFC 60 further includes a metal-diffusion suppression layer 67; and a reaction suppression layer 65. The electrolyte membrane 61 has a five-layer structure, and includes a dense substrate 66 made of vanadium (V). The electrolyte membrane 61 is provided between the oxygen electrode ($O_2$ electrode) 62, and the hydrogen electrode ($H_2$ electrode) 63. In the electrolyte membrane 61, the dense metal-diffusion suppression layer 67 and a palladium (Pd) layer 68 are provided on the surface of the substrate 66 that faces the hydrogen electrode (anode) 63 in the order stated. Also, the dense reaction suppression layer 65 (for example, a layer of a proton conductor, a mixed conductor, or an insulator), and a thin electrolyte layer 64 made of solid oxide (for example, a layer of metal oxide $SrCeO_3$, which is one of perovskite) are provided on the surface of the substrate 66 that faces the oxygen electrode (cathode) 62, in the order stated. The reaction suppression layer 65 suppresses the reaction between oxygen atoms in the electrolyte layer 64 and the substrate (V) 66. The air passages 59a and hydrogen passages 59b are formed between the electrolyte membrane and the oxygen electrode, and between the electrolyte membrane and the hydrogen electrode, respectively as in the aforementioned embodiments. As described above, the metal-diffusion suppression layer and the reaction suppression layer are described in detail in the aforementioned publication.

FIG. 10 shows a proton-exchange membrane HMFC 70 that includes an electrolyte membrane 71; an oxygen electrode ($O_2$ electrode) 72; and a hydrogen electrode ($H_2$ electrode) 73. The electrolyte membrane 71 is provided between the oxygen electrode ($O_2$ electrode) 72 and the hydrogen electrode ($H_2$ electrode) 73. The electrolyte membrane 71 has a multiple layer structure, and includes dense hydrogen-permeable metal layers. For example, in the electrolyte membrane 71, an electrolyte layer 76 is provided between the dense hydrogen-permeable metal layers. The electrolyte layer 76 is composed of a solid polymer membrane, for example, Nafion membrane (registered trademark). A palladium (Pd) layer (dense layer) 77 is provided on the surface of the electrolyte layer 76 that faces the hydrogen electrode (anode). A vanadium-nickel (V—Ni) layer (dense layer) 75, which serves as a substrate, and a Pd layer (dense layer) 74 are provided on the surface of the electrolyte layer 76 that faces the oxygen electrode (cathode), in the order stated. The air passages 59a and the hydrogen passages 59b are formed between the electrolyte membrane 71 and the oxygen electrode, and between the electrolyte membrane 71 and the hydrogen electrode, respectively as in the aforementioned embodiments. In this HMFC as well, the metal-diffusion suppression layer may be provided between the V—Ni layer 75 and the Pd layer 74. Also, the reaction suppression layer may be provided between the electrolyte layer 76 and the V—Ni layer 75 or the Pd layer 77.

In the proton-exchange membrane HMFC shown in FIG. 10, a hydrous electrolyte layer may be provided between hydrogen-permeable metal layers. With this configuration, water evaporation from the electrolyte layer and an increase in the membrane resistance at high temperatures can be suppressed. The operating temperature of the proton-exchange membrane fuel cell (PEFC), which is generally low, can be increased to 300° C. to 600° C. This fuel cell is suitable for the fuel cell system according to the invention where the cathode off-gas discharged from the fuel cell is directly supplied to the PSR reformer where the reaction should be carried out.

In the aforementioned embodiments, the mixture of gasoline vapor and water vapor is used as the reactant. However; hydrocarbon fuel other than gasoline may be used.

The invention claimed is:

1. A hydrogen generation device, comprising:
a plurality of reformers, each of which includes a catalyst, and in each of which a reforming reaction is carried out using reactant on the catalyst, and an exothermic reaction is carried out using exothermic material to heat the catalyst, wherein the reforming reaction is executed on one reformer and the exothermic reaction is executed on another reformer, and the reforming reaction and the exothermic reaction are switched when an efficiency in generating hydrogen decreases due to a catalyst temperature decreasing;
a switching portion that switches among supply passages through which the reactant is supplied to the plurality of reformers, and switches among supply passages through which the exothermic material is supplied to the plurality of reformers; and
a switching control portion configured to control the switching portion so that at least one reformer in which a temperature of the catalyst reaches a reforming-start temperature at which the reforming reaction can be carried out is selected among the plurality of reformers, and the reactant is supplied to the at least one selected reformer, in a case where the reforming reaction is started, wherein
the plurality of reformers includes a reformer that has a first heat capacity, and a reformer that has a second heat capacity that is greater than the first heat capacity; and
the switching control portion is configured to control the switching portion so that the reformer that has the first heat capacity is selected and further comprising:
a temperature detection portion that detects the temperature of the catalyst in each of the reformers; and
a determination portion that determines whether the temperature of the catalyst detected by the temperature detection portion has reached the reforming-start temperature, wherein if the determination portion determines that the temperature of the catalyst has reached the reforming-start temperature in at least one reformer, the switching control portion controls the switching portion so that the at least one reformer in which the temperature of the catalyst is determined to have reached the reforming-start temperature is selected.

2. The hydrogen generation device according to claim 1, wherein
the plurality of reformers include at least one pair of reformers that have the first heat capacity, and at least one pair of reformers that have the second heat capacity; and
the switching control portion controls the switching portion so that the at least one pair of reformers that have the first heat capacity is selected.

3. The hydrogen generation device according to claim 1, wherein
the switching portion switches among supply passages through which oxygen-containing gas is supplied; and
the switching control portion controls the switching portion so that the reactant and the oxygen-containing gas are supplied to the plurality of reformers before at least one reformer is selected.

4. The hydrogen generation device according to claim 2, wherein
the switching portion switches among supply passages through which oxygen-containing gas is supplied; and
the switching control portion controls the switching portion so that the reactant and the oxygen-containing gas are supplied to the plurality of reformers before at least one reformer is selected.

5. The hydrogen generation device according to claim 1, wherein the switching control portion operates when the hydrogen generation device is started.

6. The hydrogen generation device according to claim 2, wherein the switching control portion operates when the hydrogen generation device is started.

7. A fuel cell system, comprising:
the hydrogen generation device according to claim 1; and
a fuel cell that generates electric power using hydrogen-containing gas that is generated by the hydrogen generation device.

8. A fuel cell system, comprising:
the hydrogen generation device according to claim 2; and
a fuel cell that generates electric power using hydrogen-containing gas that is generated by the hydrogen generation device.

9. The fuel cell system according to claim 7, wherein the fuel cell includes an electrolyte membrane where an electrolyte layer is provided on at least one surface of a hydrogen-permeable metal layer.

10. The fuel cell system according to claim 8, wherein the fuel cell includes an electrolyte membrane where an electrolyte layer is provided on at least one surface of a hydrogen-permeable metal layer.

11. A method for controlling a hydrogen generation device, comprising:
determining whether a temperature of a catalyst in each of a plurality of reformers has reached a reforming-start temperature at which a reforming reaction can be carried out;
selecting at least one reformer in which the temperature of the catalyst has reached the reforming-start temperature, among the plurality of reformers; and
supplying reactant to the at least one selected reformer, wherein the reforming reaction is executed on the at least one selected reformer and the exothermic reaction is executed on another reformer, and the reforming reaction and the exothermic reaction are switched when an efficiency in generating hydrogen decreases due to a catalyst temperature decreasing.

12. A hydrogen generation device, comprising:
a plurality of reformers, each of which includes a catalyst, and in each of which a reforming reaction is carried out using reactant on the catalyst that has been heated when the reactant is supplied, and an exothermic reaction is carried out using exothermic material to heat the catalyst when the exothermic material is supplied, wherein the reforming reaction is executed on one reformer and the exothermic reaction is executed on another reformer, and the reforming reaction and the exothermic reaction are switched when an efficiency in generating hydrogen decreases due to a catalyst temperature decreasing;
a switching portion that switches among supply passages through which the reactant is supplied to the plurality of reformers, and switches among supply passages through which the exothermic material is supplied to the plurality of reformers; and
a switching control portion configured to control the switching portion so that at least one reformer in which a temperature of the catalyst reaches a reforming-start temperature at which the reforming reaction can be carried out is selected among the plurality of reformers, and the reactant is supplied to the at least one selected reformer, in a case where the reforming reaction is started and further comprising:
a temperature detection portion that detects the temperature of the catalyst in each of the reformers; and
a determination portion that determines whether the temperature of the catalyst detected by the temperature detection portion has reached the reforming-start temperature, wherein if the determination portion determines that the temperature of the catalyst has reached the reforming-start temperature in at least one reformer, the switching control portion controls the switching portion so that the at least one reformer in which the temperature of the catalyst is determined to have reached the reforming-start temperature is selected.

* * * * *